US012630044B2

(12) United States Patent
Unagami et al.

(10) Patent No.: US 12,630,044 B2
(45) Date of Patent: May 19, 2026

(54) BATTERY DATA MANAGEMENT METHOD, BATTERY DATA MANAGEMENT SYSTEM, AND RECORDING MEDIUM

(71) Applicant: Panasonic Intellectual Property Corporation of America, Torrance, CA (US)

(72) Inventors: Yuji Unagami, Osaka (JP); Motoji Ohmori, Osaka (JP); Toshihiro Inokuchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 982 days.

(21) Appl. No.: 17/861,766

(22) Filed: Jul. 11, 2022

(65) Prior Publication Data

US 2022/0340039 A1      Oct. 27, 2022

Related U.S. Application Data

(63) Continuation of application No. PCT/JP2021/000971, filed on Jan. 14, 2021.

(Continued)

(51) Int. Cl.
*H02J 7/00*          (2006.01)
*B60L 53/65*        (2019.01)
(Continued)

(52) U.S. Cl.
CPC .............. *B60L 53/68* (2019.02); *B60L 53/65* (2019.02); *B60L 53/66* (2019.02); *B60L 58/12* (2019.02);
(Continued)

(58) Field of Classification Search
CPC ..... H02J 7/0048; H02J 7/00045; B60L 58/12; B60L 53/66
See application file for complete search history.

(56) References Cited

U.S. PATENT DOCUMENTS 8,515,865 B1 * 8/2013 Marathe ................. B60L 53/60
705/40
2014/0059350 A1     2/2014 Unagami et al.
(Continued)

FOREIGN PATENT DOCUMENTS

EP        2 634 889        9/2013
JP        2012-222945      11/2012
(Continued)

OTHER PUBLICATIONS

Extended European Search Report issued Jun. 19, 2023 in corresponding European Patent Application No. 21741341.8.
(Continued)

*Primary Examiner* — Robert Grant
(74) *Attorney, Agent, or Firm* — Wenderoth, Lind & Ponack, L.L.P.

(57) ABSTRACT

A battery data management method for use in a battery data management system including an electric vehicle and a plurality of authentication servers each including a distributed ledger includes: obtaining, by the electric vehicle, first sensor information about a battery attached to the electric vehicle; generating, by the electric vehicle, first transaction data including the ID of the battery and the first sensor information; obtaining the first transaction data by one authentication server included in the plurality of authentication servers; and recording a block including the first transaction data into the distributed ledger by the one authentication server.

15 Claims, 14 Drawing Sheets

Related U.S. Application Data

(60) Provisional application No. 62/962,469, filed on Jan. 17, 2020.

(51) Int. Cl.
  B60L 53/66          (2019.01)
  B60L 53/68          (2019.01)
  B60L 58/12          (2019.01)

(52) U.S. Cl.
  CPC ........ *H02J 7/00045* (2020.01); *H02J 7/0048* (2020.01); *B60L 2240/14* (2013.01); *B60L 2240/545* (2013.01); *B60L 2240/547* (2013.01); *B60L 2240/549* (2013.01)

(56)                References Cited

U.S. PATENT DOCUMENTS

| | | |
|---|---|---|
| 2019/0042726 A1 | 2/2019 | Unagami et al. |
| 2019/0329669 A1 | 10/2019 | Soeda et al. |

FOREIGN PATENT DOCUMENTS

| | | |
|---|---|---|
| JP | 2015-15827 | 1/2015 |
| JP | 2016-116310 | 6/2016 |
| JP | 2019-29988 | 2/2019 |
| JP | 2019-192630 | 10/2019 |
| WO | 2013/108318 | 7/2013 |
| WO | 2020/009666 | 1/2020 |

OTHER PUBLICATIONS

International Search Report (ISR) issued on Mar. 9, 2021 in International (PCT) Application No. PCT/JP2021/000971.

* cited by examiner

BATTERY DATA MANAGEMENT METHOD, BATTERY DATA MANAGEMENT SYSTEM, AND RECORDING MEDIUM

CROSS REFERENCE TO RELATED APPLICATIONS

This is a continuation application of PCT International Application No. PCT/JP2021/000971 filed on Jan. 14, 2021, designating the United States of America, which is based on and claims priority of U.S. Provisional Patent Application No. 62/962,469 filed on Jan. 17, 2020. The entire disclosures of the above-identified applications, including the specifications, drawings and claims are incorporated herein by reference in their entirety.

FIELD

The present disclosure relates to battery data management methods, battery data management systems, and recording media.

BACKGROUND

In recent years, electric vehicles such as electric cars and electric motorcycles have begun to be used. When replaceable batteries are used for power supplies of the electric vehicles, for example, a service including not only charging batteries, but also replacing batteries provided in charging stations is being considered. In this service, two or more batteries are simultaneously charged at the charging stations, and thus charged batteries can be provided to users at any time needed. Therefore, users can replace a battery running out by another charged battery at the charging stations. Thus, without having to consider time for charging the battery, users only need to replace the battery to allow the electric vehicle to continue traveling, meaning that mileage may increase, for example.

Furthermore, in this service, the use of batteries that can be shared among different manufacturers of the electric vehicles can lead to scale advantages of multiple manufacturers providing the charging stations at various locations.

On the other hand, if an anomalous battery is mixed in the service of replacing the batteries, the electric vehicle may become unable to operate properly or, in the worst case, a fire may occur due to the battery, for example. Note that, for example, Patent Literature (PTL) 1 discloses a method for detecting an anomalous battery.

Even normal batteries have different levels of degradation depending on usage, etc. Therefore, in order to provide charged batteries to users at any time needed, it is necessary to evaluate the remaining values of the batteries. This is because, even when normal batteries are used in the service of replacing the batteries, the distance the vehicle can continue to travel varies depending on a new battery and thus, depending on the level of degradation of the battery, said battery may need to be removed from the charging stations.

CITATION LIST

Patent Literature

PTL 1: International Publication No. 2013/108318

SUMMARY

Technical Problem

However, it is problematic in that if the usage, etc., of a battery is tampered with, the remaining value of the battery cannot be properly evaluated, leading to a failure of the service of replacing the batteries with scale advantages.

The present disclosure is conceived in view of the above-described circumstances and has an object to provide a battery data management method and the like in which data of a battery installed in an electric vehicle can be managed in a manner that precludes tampering.

Solution to Problem

In order to achieve the aforementioned object, a battery data management method according to the present disclosure is a battery data management method for use in a battery data management system including an electric vehicle and a plurality of authentication servers each including a distributed ledge. The battery data management method includes: obtaining, by the electric vehicle, first sensor information about a battery attached to the electric vehicle; generating, by the electric vehicle, first transaction data including an ID of the battery and the first sensor information; obtaining the first transaction data by one authentication server included in the plurality of authentication servers; and recording a block including the first transaction data into the distributed ledger by the one authentication server.

Note that these general and specific aspects may be implemented using a system, an integrated circuit, a computer program, or a computer-readable recording medium such as compact disc read-only memory (CD-ROM), or any combination of systems, methods, integrated circuits, computer programs, and recording media.

Advantageous Effects

With the battery data management method and the like according to the present disclosure, data of a battery installed in an electric vehicle can be managed in a manner that precludes tampering.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a block diagram illustrating one example of the overall configuration of an electric vehicle according to the exemplary embodiment.

FIG. 3 is a block diagram illustrating one example of the configuration of a vehicle manager illustrated in FIG. 2.

FIG. 8 is a block diagram illustrating one example of the configuration of a battery manufacturing supplier server according to the exemplary embodiment.

DESCRIPTION OF EMBODIMENTS

Figure 1:
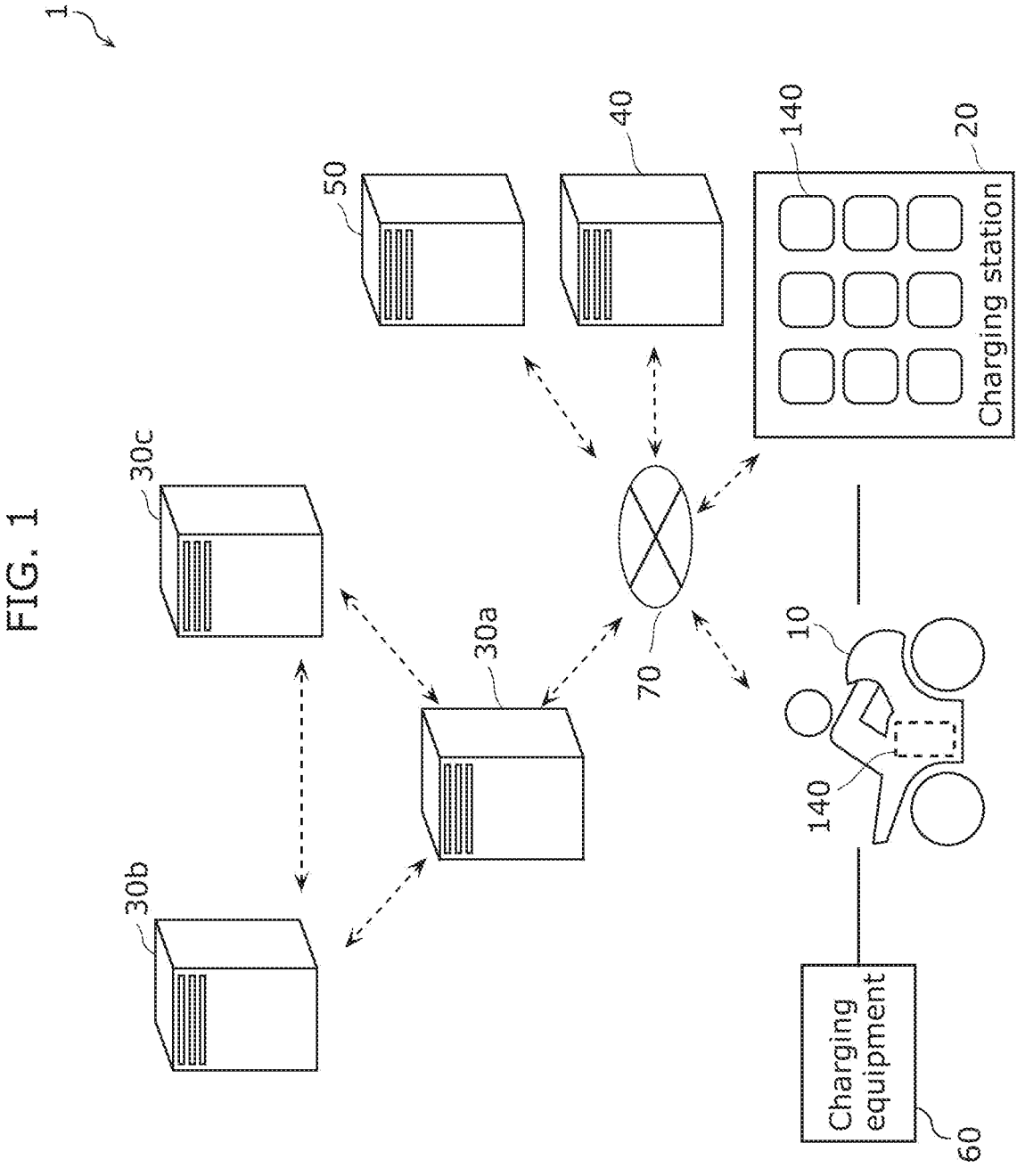
FIG. 1 is a diagram illustrating one example of the overall configuration of a battery data management system according to an exemplary embodiment.

A battery data management method according to one embodiment of the present disclosure is a battery data management method for use in a battery data management system including an electric vehicle and a plurality of authentication servers each including a distributed ledge. The battery data management method includes: obtaining, by the electric vehicle, first sensor information about a battery attached to the electric vehicle; generating, by the electric vehicle, first transaction data including an ID of the battery and the first sensor information; obtaining the first transaction data by one authentication server included in the plurality of authentication servers; and recording a block including the first transaction data into the distributed ledger by the one authentication server.

With this, the first sensor information that is data of the battery can be stored in the distributed ledger. Thus, the data of the battery installed in the electric vehicle can be managed in a manner that precludes tampering.

Furthermore, in the obtaining of the first sensor information, the electric vehicle may obtain travel data obtained during travel of the electric vehicle and the first sensor information obtained during the travel, and in the generating of the first transaction data, the electric vehicle may generate the first transaction data that includes the ID of the battery, the travel data, and the first sensor information obtained during the travel.

Furthermore, the battery data management method may further include: performing first mutual authentication between the electric vehicle and the battery before the obtaining of the first sensor information about the battery;

and obtaining the first sensor information about the battery by the electric vehicle when the first mutual authentication is successful.

Furthermore, the first sensor information may include a voltage, an electric current, a temperature, and an impedance at the battery and acceleration information of the electric vehicle having the battery attached thereto.

Furthermore, the battery data management system may further include a charging station capable of charging the battery when the battery is connected to the charging station, and the battery data management method may further include: obtaining, by the charging station, second sensor information about the battery charged by connection to the charging station; generating, by the charging station, second transaction data including the ID of the battery and the second sensor information; obtaining the second transaction data by the one authentication server; and recording a block including the second transaction data into the distributed ledger by the one authentication server.

Furthermore, the battery data management method may further include: performing, before the obtaining of the second sensor information about the battery, second mutual authentication between the charging station and the battery connected to the charging station for the purpose of charging; and obtaining the second sensor information by the charging station when the second mutual authentication is successful.

Furthermore, the second sensor information may include a voltage, an electric current, a temperature, and an impedance at the battery.

Furthermore, the battery data management system may further include a battery evaluation server, and the battery data management method may further include: obtaining transaction data about the battery by the battery evaluation server, the transaction data being recorded in the distributed ledger; evaluating the battery by the battery evaluation server using the transaction data about the battery that has been obtained; generating third transaction data including an evaluation result of the battery and the ID of the battery by the battery evaluation server; obtaining the third transaction data by the one authentication server; and recording a block including the third transaction data into the distributed ledger by the one authentication server.

Furthermore, the evaluation result of the battery may include an evaluation result of a state of the battery, the state including a remaining value of the battery.

Furthermore, the evaluation result of the battery may include a battery ID of the battery and a determination on whether or not to recycle the battery, the determination being made based on a state of the battery.

Furthermore, a battery data management system according to one embodiment of the present disclosure is a battery data management system including: a plurality of authentication servers each including a distributed ledger; and an electric vehicle. The electric vehicle includes: a first communicator that obtains first sensor information about a battery attached to the electric vehicle; and a transaction data generator that generates first transaction data including an ID of the battery and the first sensor information. One authentication server included in the plurality of authentication servers includes: a second communicator that obtains the first transaction data; and a recorder that records a block including the first transaction data into the distributed ledger.

Hereinafter, an exemplary embodiment will be described with reference to the Drawings. Note that each exemplary embodiment described below shows a specific example of the present disclosure. The numerical values, shapes, materials, structural elements, the arrangement and connection of the structural elements, steps, the processing order of the steps, etc., shown in the following exemplary embodiment are mere examples, and therefore are not intended to limit the present disclosure. The present disclosure is specified based on the recitation of the Claims. Thus, among the structural elements in the following exemplary embodiment, those not recited in any one of the independent claims which indicate the broadest concepts of the present disclosure are described as structural elements that are not necessarily required to achieve the object of the present disclosure, but are included in a more preferable exemplary embodiment.

EXEMPLARY EMBODIMENT

First, a system configuration of the present disclosure will be described.

[1. System Configuration]

Battery data management according to the present disclosure is recording, into a distributed ledger, data of a battery that is used to evaluate the remaining value of the battery. Thus, a battery data management system according to the present disclosure is capable of storing said data using the blockchain technology in a manner that precludes at least tampering. Furthermore, when said data is recorded into the distributed ledger, the credibility of said data can be ensured. Therefore, individual batteries can be effectively used, for example, when batteries degrading fast are used for devices other than electric vehicles at proper timing and thus, each battery can be used in a way that is appropriate for the battery.

Hereinafter, a battery data management system and the like according to an exemplary embodiment will be described with reference to the drawings.

[1.1 Overall Configuration of Battery Data Management System 1]

FIG. 1 is a diagram illustrating one example of the overall configuration of battery data management system 1 according to the present exemplary embodiment. As illustrated in FIG. 1, battery data management system 1 includes electric vehicle 10, charging station 20, authentication servers 30a, 30b, 30c, battery manufacturing supplier server 40, battery recycling supplier server 50, and charging equipment 60. These except charging equipment 60 are connected via communication network 70.

Each of authentication servers 30a, 30b, 30c is connected to a storage device that includes a distributed ledger into which transaction data and blocks of a blockchain are electronically recorded. Note that each of authentication servers 30a, 30b, 30c may be connected to the storage device via communication network 70 or may include the storage device therein. There are cases where authentication servers 30a, 30b, 30c are hereinafter referred to as authentication server 30.

Note that FIG. 1 illustrates an example in which battery data management system 1 includes three authentication servers 30, but this is not limiting. Specifically, battery data management system 1 may include four or more authentication servers 30.

Hereinafter, each element will be described.

[1.2 Configuration of Electric Vehicle 10]

Figure 2:
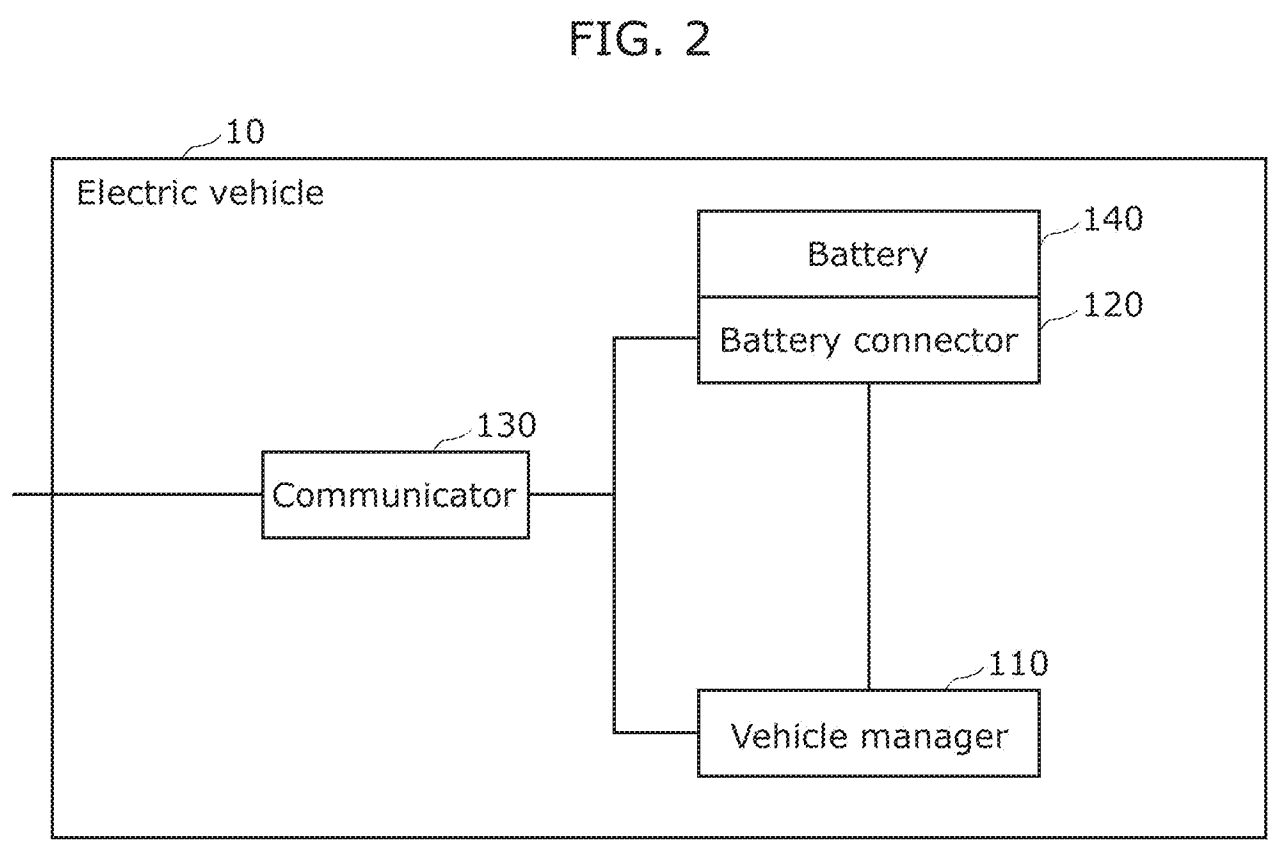

FIG. 2 is a block diagram illustrating one example of the overall configuration of electric vehicle 10 according to the present exemplary embodiment.

Electric vehicle 10 is, for example, an electric motorcycle or an electric car, but is not limited to this example. Electric vehicle 10 may be a flying car, a flying motorcycle, an airplane, or a ship as long as electric vehicle 10 can generate motive power using electric power of battery 140 and accelerate the vehicle body.

In the present exemplary embodiment, electric vehicle 10 includes vehicle manager 110, battery connector 120, and communicator 130, as illustrated in FIG. 2.

Vehicle manager 110 is a processor that performs control related to the operation of electric vehicle 10. A specific configuration of vehicle manager 110 will be described later with reference to FIG. 3.

Battery connector 120 is used for connection to battery 140. When battery 140 is connected to battery connector 120 by being attached at a predetermined position on electric vehicle 10, battery connector 120 receives electric power supplied from battery 140. The electric power supplied from battery 140 is supplied to an actuator (for example, a motor) that generates motive power for electric vehicle 10, a control circuit that realizes vehicle manager 110, and a communication interface that realizes communicator 130, for example.

Communicator 130 communicates with authentication server 30 via communication network 70. Communicator 130 is not limited to being connected to authentication server 30 via communication network 70 in a manner that allows for communication therebetween, but may be connected to another device via communication network in a manner that allows for communication therebetween. Furthermore, communicator 130 may be directly connected to another device in a manner that allows for communication therebetween. It is sufficient that the communication interface that realizes communicator 130 be a communication interface capable of being connected to communication network 70 and communicating therewith. Note that the communication interface that realizes communicator 130 may be included in a control circuit that realizes vehicle manager 110.

[1.2.1 Vehicle Manager 110]

Hereinafter, one example of the configuration of vehicle manager 110 will be described.

Figure 3:
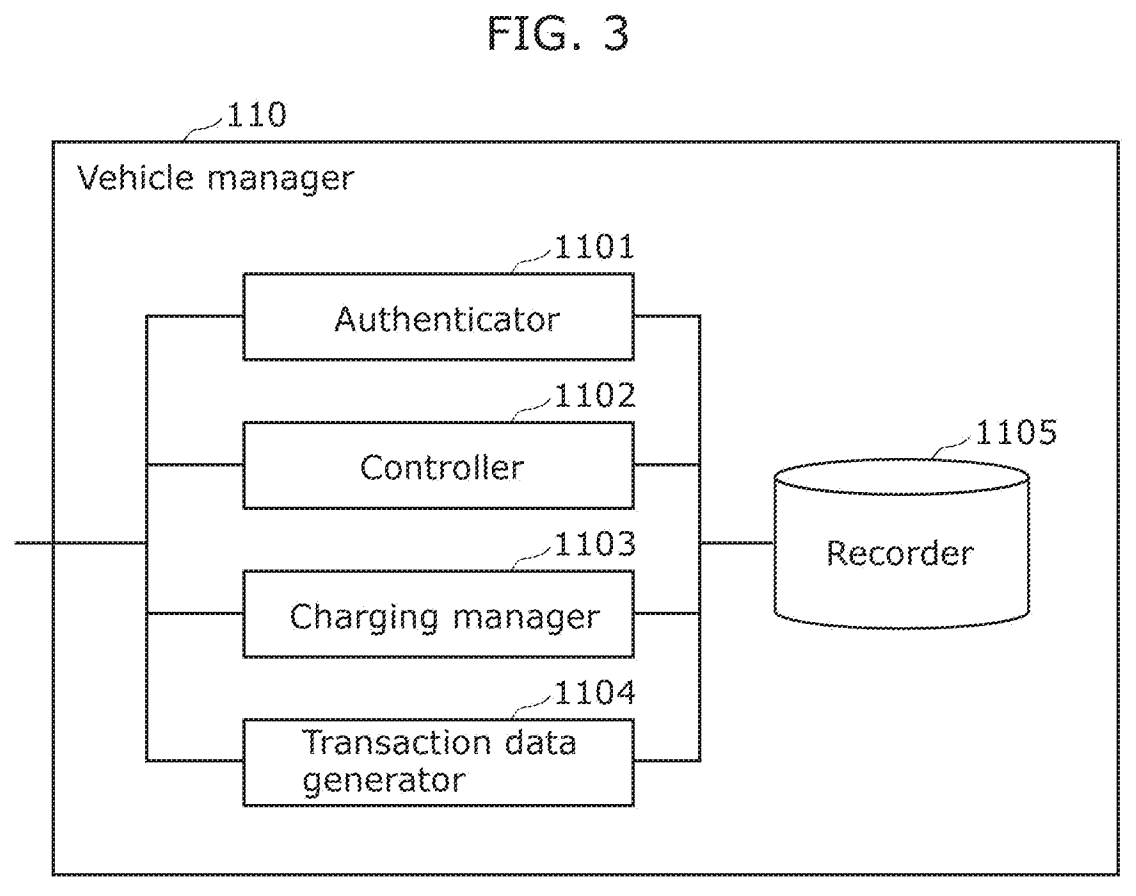

FIG. 3 is a block diagram illustrating one example of the configuration of vehicle manager 110 illustrated in FIG. 2.

As mentioned above, vehicle manager 110 is a processor that performs control related to the operation of electric vehicle 10. Vehicle manager 110 is realized using a control circuit including a processor and memory, for example. As illustrated in FIG. 3, for example, vehicle manager 110 includes authenticator 1101, controller 1102, charging manager 1103, transaction data generator 1104, and recorder 1105. Hereinafter, each structural element will be described.

<Authenticator 1101>

Authenticator 1101 authenticates battery 140 connected to battery connector 120. Authenticator 1101 includes a security chip in which a cryptographic key or a certificate to be used for the authentication is held. This security chip is tamperproof in order to protect the cryptographic key or the certificate held therein from tampering and leakage. Note that authenticator 1101 may perform the process of authenticating battery 140 using transport layer security (TLS) or may perform mutual authentication between authenticator 1101 and battery 140 using the TLS, for example.

Authenticator 1101 is not required to include the security chip in which the cryptographic key or the certificate is held. When authenticator 1101 does not include the security chip, vehicle manager 110 may include the security chip, for example. Even in this case, authenticator 1101 includes the cryptographic key or the certificate that has been encrypted. Therefore, the cryptographic key or the certificate that has been encrypted may be decoded in the security chip of vehicle manager 110, and authenticator 1101 may perform the authentication using the cryptographic key or the certificate that has been decoded.

Authenticator 1101 authenticates battery 140 and when the result of the authentication indicates that battery 140 connected to battery connector 120 is anomalous, outputs the ID of anomalous battery 140 (hereinafter also referred to as battery ID) to recorder 1105. When electric vehicle 10 is connected to battery manufacturing supplier server 40 via communication network 70, authenticator 1101 may notify battery manufacturing supplier server 40 of the battery ID of anomalous battery 140 connected to battery connector 120.

Note that authenticator 1101 may authenticate a user who operates electric vehicle 10. In this case, authenticator 1101 may obtain user information from a user authentication server and authenticate the user, or may transmit user information to a user authentication server and request the user authentication server to authenticate the user, for example.

<Controller 1102>

Controller 1102 controls the operation of electric vehicle 10. According to user input to electric vehicle 10, controller 1102 controls the operation of an actuator that generates motive power for electric vehicle 10. For example, controller 1102 controls the operation related to the travel of electric vehicle 10 according to the user input. Note that as described above, controller 1102 operates with the electric power supplied from battery 140 via battery connector 120.

<Charging Manager 1103>

Charging manager 1103 controls charging of battery 140 connected to battery connector 120. When electric vehicle 10 is connected to a power supply, charging manager 1103 charges battery 140 connected to battery connector 120 with the electric power supplied from the power supply. The power supply may be charging equipment 60 or may be an electrical outlet in a home, for example.

<Transaction Data Generator 1104>

Transaction data generator 1104 obtains sensor information of battery 140 obtained upon charging or during the travel of electric vehicle 10.

In the present exemplary embodiment, transaction data generator 1104 obtains sensor information of battery 140 obtained during the travel of electric vehicle 10 (also referred to as first sensor information). The first sensor information includes the voltage, the electric current, the temperature, and the impedance at battery 140 during the travel of electric vehicle 10, and acceleration information of electric vehicle 10 to which said battery 140 is attached. Note that transaction data generator 1104 is capable of obtaining, from battery 140 during the travel of electric vehicle 10, the temperature, the voltage, and the electric current that are included in the first sensor information, and obtaining the acceleration information from controller 1102 as the acceleration of electric vehicle 10. The acceleration information of electric vehicle 10 is information about physical impact on battery 140. Note that the first sensor information may include the amount of discharging measured during the travel. Furthermore, the first sensor information includes at least one of the voltage, the electric current, the temperature, and the impedance measured during the travel, and the acceleration information of electric vehicle 10.

Furthermore, for example, transaction data generator 1104 obtains sensor information of battery 140 obtained upon charging (also referred to as second sensor information). The second sensor information includes the voltage, the electric current, the temperature, and the impedance at battery 140 measured upon charging. The second sensor information may further include the amount of charging and the number of times of charging. Note that transaction data generator 1104 can obtain the second sensor information from battery 140 that is being charged.

Transaction data generator 1104 generates transaction data in the blockchain.

In the present exemplary embodiment, transaction data generator 1104 generates transaction data including the obtained sensor information, specifically, the first sensor information or the second sensor information, and the battery ID of said battery 140. In the case of including the first sensor information in the transaction data being generated, transaction data generator 1104 may further include the ID of electric vehicle 10 or may further include travel data of electric vehicle 10. In the case of including the second sensor information in the transaction data being generated, transaction data generator 1104 may further include the ID of charging station 20 used to charge said battery 140 or may further include the ID of charging equipment 60 used to charge said battery 140.

Transaction data generator 1104 transmits the generated transaction data to authentication server 30.

<Recorder 1105>

Recorder 1105 may be, for example, a storage medium including rewritable non-volatile memory such as a hard disk drive or a solid-state drive. Recorder 1105 records the battery ID of anomalous battery 140. Each time anomalous battery 140 is connected to battery connector 120, recorder 1105 records the battery ID of anomalous battery 140 connected to battery connector 120 and thus manages the battery ID of anomalous battery 140.

Note that recorder 1105 may further manage the battery ID of normal battery 140. Specifically, regardless of whether battery 140 is anomalous or not, recorder 1105 may store the battery ID of every battery 140 connected to battery connector 120. In this case, each time battery 140 is connected to battery connector 120, recorder 1105 stores the battery ID of battery 140 connected to battery connector 120. Furthermore, it is sufficient that recorder 1105 further store an identifier indicating whether battery 140 is anomalous or normal, in order to distinguish between the battery ID of anomalous battery 140 and the battery ID of normal battery 140. This allows recorder 1105 to record and manage the battery ID of anomalous battery 140 and the battery ID of normal battery 140.

[1.2.2 Configuration of Battery 140]

Next, one example of the configuration of battery 140 will be described.

Figure 4:
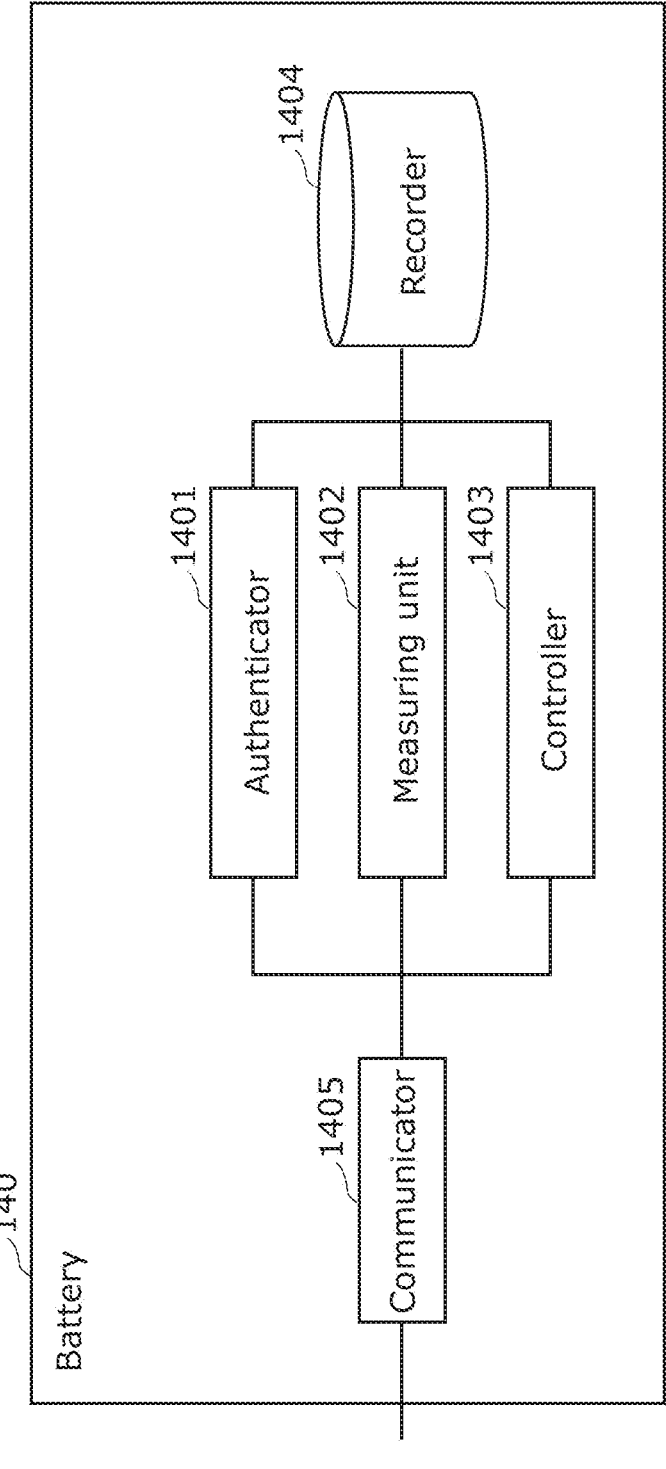
FIG. 4 is a block diagram illustrating one example of the configuration of a battery according to the exemplary embodiment.

FIG. 4 is a block diagram illustrating one example of the configuration of battery 140 according to the present exemplary embodiment.

Battery 140 includes authenticator 1401, measuring unit 1402, controller 1403, recorder 1404, and communicator 1405, as illustrated in FIG. 4, for example. Hereinafter, each structural element will be described.

<Authenticator 1401>

Authenticator 1401 authenticates vehicle manager 110 connected thereto in order to supply the electric power stored in battery 140 or charging station 20 connected thereto in order to charge battery 140. Authenticator 1401 includes a security chip in which a cryptographic key or a certificate to be used for the authentication is held. This security chip is tamperproof in order to protect the cryptographic key or the certificate held therein from tampering and leakage.

Note that authenticator 1401 may perform the process of authenticating vehicle manager 110 or charging station 20 using the TLS or may perform mutual authentication between vehicle manager 110 and charging station 20 using the TLS, for example.

Authenticator 1401 is not required to include the security chip in which the cryptographic key or the certificate is held. When authenticator 1401 does not include the security chip, battery 140 may include the security chip, for example. Even in this case, authenticator 1401 includes the cryptographic key or the certificate that has been encrypted. Therefore, the cryptographic key or the certificate that has been encrypted may be decoded in the security chip of battery 140, and authenticator 1401 may perform the authentication using the cryptographic key or the certificate that has been decoded.

On each occasion of the connection, authenticator 1401 authenticates electric vehicle 10 or charging station 20. When the result of the authentication indicates that electric vehicle 10 connected is anomalous or that charging station 20 connected is anomalous, authenticator 1401 records, into recorder 1404, the ID of anomalous electric vehicle 10 (hereinafter also referred to as vehicle ID) or the ID of anomalous charging station 20.

<Measuring Unit 1402>

Measuring unit 1402 measures the number of times battery 140 has been charged and the amount of charging of battery 140. Furthermore, measuring unit 1402 measures the temperature, voltage, and electric current at the battery upon charging. When measuring unit 1402 includes an acceleration sensor or the like, measuring unit 1402 may measure the acceleration of battery 140.

Measuring unit 1402 may measure the temperature, voltage, and electric current of the battery at regular time intervals. Furthermore, measuring unit 1402 may measure these on each occasion of the connection to electric vehicle 10 or charging station 20.

<Controller 1403>

Controller 1403 controls charging and discharging of battery 140.

<Recorder 1404>

Recorder 1404 may be, for example, a storage medium including rewritable non-volatile memory such as a hard disk drive or a solid-state drive. Recorder 1404 records measurement data obtained by measuring unit 1402. Recorder 1404 may store the measurement data and the measurement date and time of said measurement data in association. Recorder 1404 may include a security chip (memory) that is tamperproof to protect the measurement data from tampering.

<Communicator 1405>

When battery 140 is connected to battery connector 120 of electric vehicle 10, communicator 1405 is connected to electric vehicle 10 in a manner that allows communication therebetween. Similarly, when battery 140 is connected to charging station 20 for the purpose of charging, communicator 1405 is connected to charging station 20 in a manner that allows communication therebetween.

[1.3 Configuration of Charging Station 20]

Next, one example of the configuration of charging station 20 will be described.

Charging station 20 is equipment that can simultaneously charge and hold one or more batteries 140. For example, as illustrated in FIG. 1, charging station 20 includes one or more segments in each of which battery 140 can be charged. Specifically, each of the one or more segments can charge battery 140 when said battery 140 is stored and connected thereto.

Figure 5:
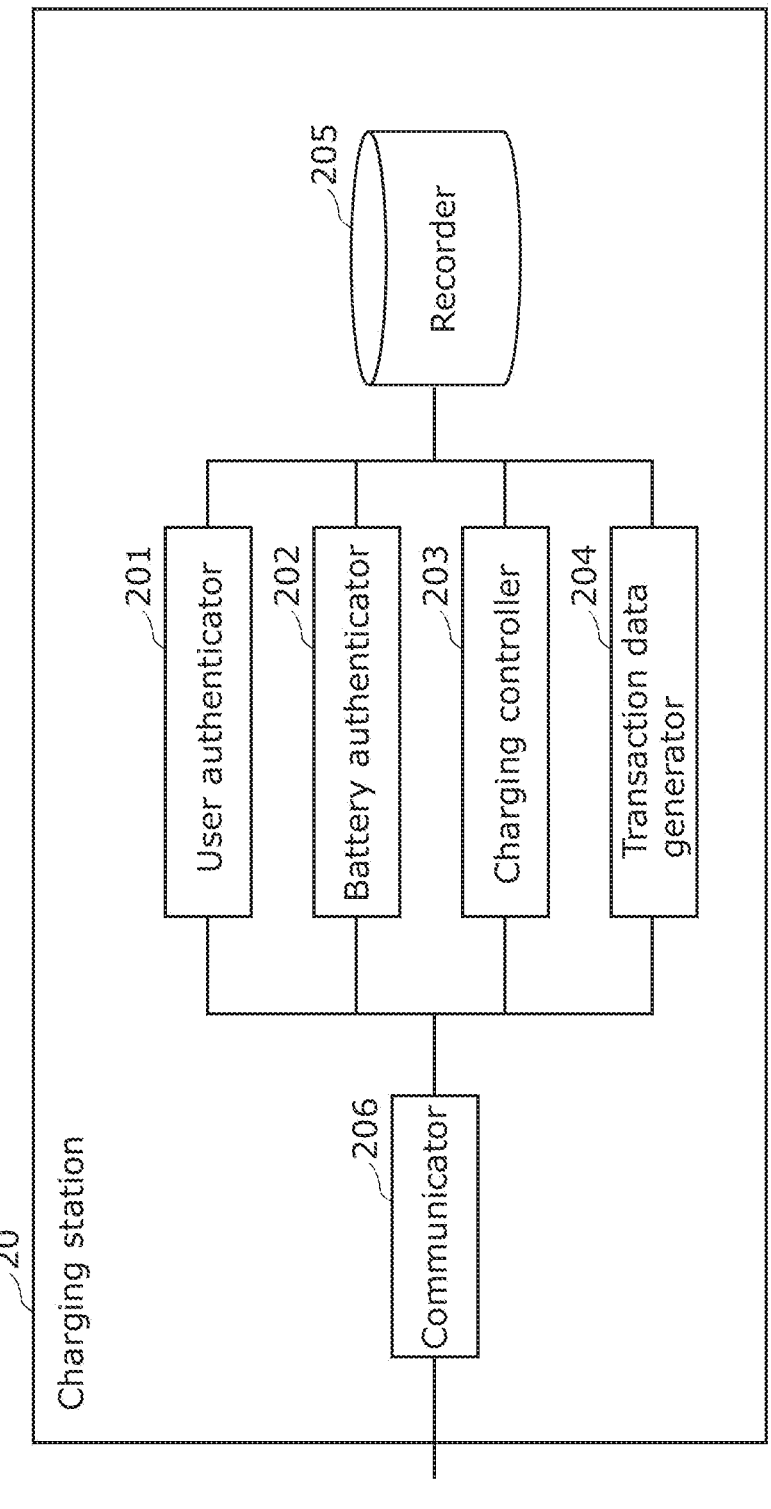
FIG. 5 is a block diagram illustrating one example of the configuration of a charging station according to the exemplary embodiment.

FIG. 5 is a block diagram illustrating one example of the configuration of charging station 20 according to the present exemplary embodiment.

Charging station 20 includes user authenticator 201, battery authenticator 202, charging controller 203, transaction data generator 204, recorder 205, and communicator 206, as illustrated in FIG. 5, for example.

<User Authenticator 201>

User authenticator 201 authenticates a user who uses charging station 20.

For example, user authenticator 201 may obtain the ID and the password of the user from an input interface not illustrated in the drawings and perform password authentication using the ID and the password of the user. In the password authentication, user authenticator 201 can authenticate a user by comparing the ID and the password of the user obtained from the input interface and the ID and the password of a user registered in advance. The ID and the password of the user registered in advance is one example of the user information.

Furthermore, for example, user authenticator 201 may authenticate a user by using a membership card of the user. In the authentication in which a membership card is used, user authenticator 201 can authenticate a user by comparing information of a membership card registered in advance and information of a membership card read by the input interface. The information of the membership card registered in advance is one example of the user information.

Furthermore, user authenticator 201 may perform biometric authentication for users. In the biometric authentication, for example, face authentication or iris authentication through an input interface such as a camera may be performed. In the biometric authentication, user authenticator 201 can authenticate a user by comparing biometric information of a user registered in advance and biometric information of a user read by the input interface. The biometric information of the user registered in advance is one example of the user information.

User authenticator 201 may use an existing authentication method other than the authentication method described above. User authenticator 201 may obtain, from authentication server 30, the user information registered in advance to be used for the user authentication. User authenticator 201 may transmit the user information obtained from the input interface to authentication server 30 at the time of authentication, and obtain the result of the authentication process performed at authentication server 30.

<Battery Authenticator 202>

Battery authenticator 202 authenticates battery 140 stored in charging station 20 and connected for the purpose of charging. Battery authenticator 202 includes a security chip in which a cryptographic key or a certificate to be used for the authentication is held. This security chip is tamperproof in order to protect the cryptographic key or the certificate held therein from tampering and leakage.

Note that battery authenticator 202 may perform, using the TLS, for example, the process of authenticating battery 140 connected for the purpose of charging, or may perform, using the TLS, mutual authentication between battery authenticator 202 and battery 140 connected for the purpose of charging.

Battery authenticator 202 is not required to include the security chip in which the cryptographic key or the certificate is held. When battery authenticator 202 does not include the security chip, battery 140 may include the security chip, for example. Even in this case, battery authenticator 202 includes the cryptographic key or the certificate that has been encrypted. Therefore, the cryptographic key or the certificate that has been encrypted may be decoded in the security chip of battery 140, and battery authenticator 202 may perform the authentication using the cryptographic key or the certificate that has been decoded.

Furthermore, when the authentication of battery 140 is successful and charging is completed, battery authenticator 202 may notify authentication server 30 of the number of times of charging.

Note that when the result of the authentication of battery 140 indicates that battery 140 connected is anomalous, battery authenticator 202 outputs the battery ID of anomalous battery 140 to recorder 205. When charging station 20 is connected to battery manufacturing supplier server 40 via communication network 70, battery authenticator 202 may notify battery manufacturing supplier server 40 of the battery ID of anomalous battery 140 connected.

<Charging Controller 203>

Charging controller 203 controls charging of battery 140 stored in charging station 20 and connected for the purpose of charging.

Note that when the user authentication by user authenticator 201 is unsuccessful and the authentication of battery 140 by battery authenticator 202 is unsuccessful, charging controller 203 avoids charging of battery 140. In other words, when the user is an unauthorized user or when battery 140 is anomalous battery 140, battery 140 is prohibited from being charged, and thus charging controller 203 avoids charging of battery 140.

<Transaction Data Generator 204>

Transaction data generator 204 obtains the second sensor information of battery 140 obtained upon charging. The second sensor information includes the voltage, the electric current, the temperature, and the impedance at battery 140 measured upon charging, as mentioned above. The second sensor information may further include the amount of charging and the number of times of charging.

Transaction data generator 204 generates transaction data in the blockchain. In the present exemplary embodiment, transaction data generator 204 generates transaction data including the obtained second sensor information and the battery ID of said battery 140. Transaction data generator 204 may generate said transaction data such that said transaction data further includes the temperature of charging station 20 measured upon charging in addition to the ID of charging station 20 used to charge said battery 140.

Furthermore, transaction data generator 204 transmits the generated transaction data to authentication server 30.

<Recorder 205>

Recorder 205 may be, for example, a storage medium including rewritable non-volatile memory such as a hard disk drive or a solid-state drive. Recorder 205 records the battery ID of battery 140 connected to charging station 20 for the purpose of charging. Recorder 205 may record the data of battery 140 such as the number of times of charging of battery 140 having said battery ID in association with said battery ID.

Recorder 205 may record the battery ID of every battery 140 connected for the purpose of charging. In this case, it is sufficient that each time battery 140 is connected to charging station 20, recorder 205 record the battery ID of battery 140 connected. Note that recorder 205 may record the battery ID and the date and time of connection of battery 140 having said battery ID to charging station 20 in association with each other. Furthermore, recorder 205 may further record an identifier indicating whether battery 140 is anomalous or normal, in order to distinguish between the battery ID of anomalous battery 140 and the battery ID of normal battery 140. This allows recorder 205 to manage the battery ID of anomalous battery 140 and the battery ID of normal battery 140.

<Communicator 206>

Communicator 206 is connected to battery 140 in a manner that allows for communication therebetween when battery 140 is connected to charging station 20 for the purpose of charging. Communicator 206 obtains, from battery 140 connected to charging station 20, battery data, namely, the second sensor information and the battery ID, of battery 140. Note that communicator 206 is one example of the obtainer.

[1.4 Configuration of Authentication Server 30]

Using the blockchain technology, authentication servers 30a, 30b, 30c manage the data of battery 140 installed in electric vehicle 10, in a manner that precludes tampering.

Since authentication servers 30a, 30b, 30c have substantially the same configuration, the following describes authentication server 30a as an example.

Figure 6:
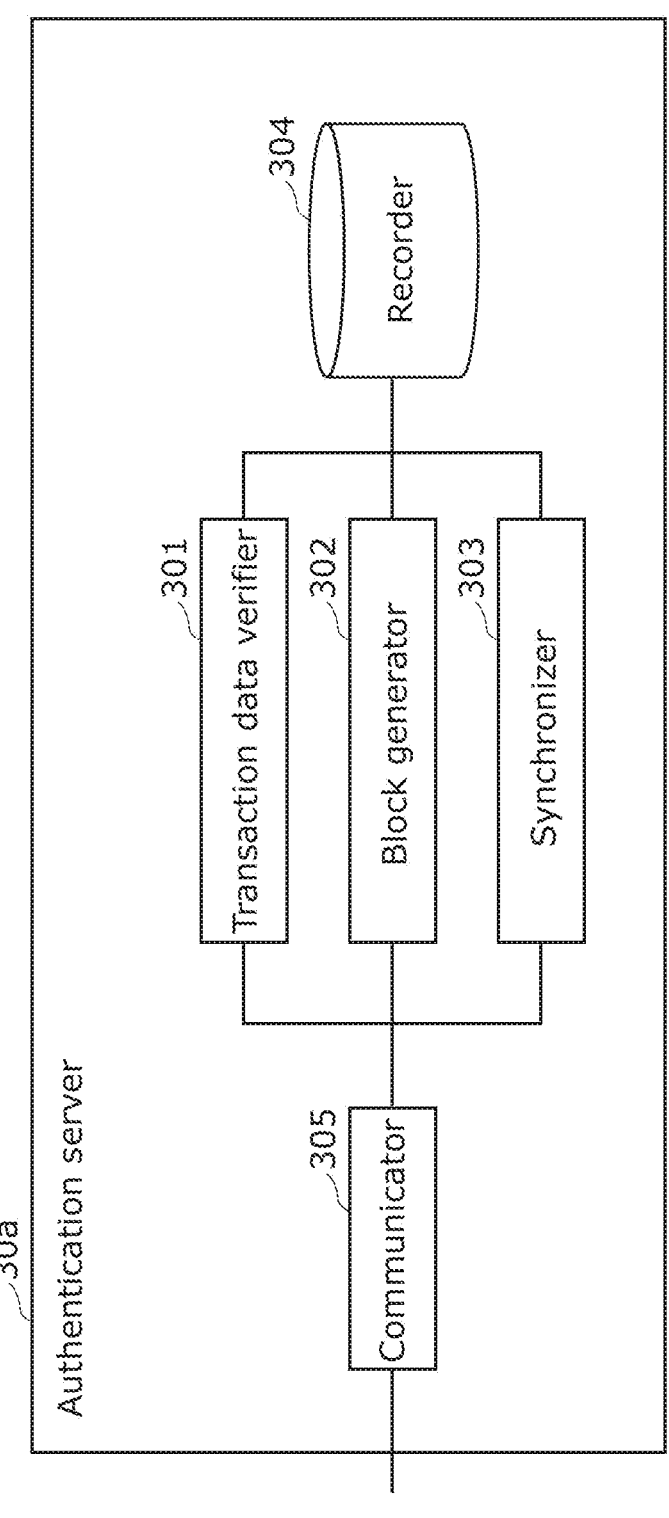
FIG. 6 is a block diagram illustrating one example of the configuration of an authentication server according to the exemplary embodiment.

FIG. 6 is a block diagram illustrating one example of the configuration of authentication server 30a according to the present exemplary embodiment. Authentication server 30a includes transaction data verifier 301, block generator 302, synchronizer 303, recorder 304, and communicator 305, as illustrated in FIG. 6. Authentication server 30a can be realized by a processor executing a predetermined program using memory. Hereinafter, each structural element will be described.

<Transaction Data Verifier 301>

Transaction data verifier 301 verifies the obtained transaction data. For example, when authentication server 30a obtains the transaction data from electric vehicle 10, charging station 20, or the like, transaction data verifier 301 verifies whether an address or a signature added to the transaction data is valid.

When transaction data verifier 301 confirms the validity of the transaction data as a result of the verification, transaction data verifier 301 records said transaction data into recorder 304. Here, when transaction data verifier 301 confirms the validity of the transaction data, transaction data verifier 301 notifies synchronizer 303 of this result.

<Block Generator 302>

When the verification of the transaction data is successful in transaction data verifier 301, block generator 302 executes a consensus algorithm for the transaction data among authentication servers 30. As the consensus algorithm, a consensus algorithm called practical Byzantine fault tolerance (PBFT) may be used, or other known consensus algorithms such as proof of work (PoW) may also be used.

In the present exemplary embodiment, block generator 302 executes the consensus algorithm between authentication server 30b and authentication server 30c. Specifically, block generator 302 first generates a block in the blockchain that includes one or more items of the transaction data. Next, block generator 302 executes the consensus algorithm. Subsequently, when an agreement is made as a result of execution of the consensus algorithm, block generator 302 records the generated block into recorder 304. In recorder 304, the block generated by block generator 302 is connected to the blockchain and is thus recorded.

Next, the data structure of the blockchain will be described.

Figure 7:
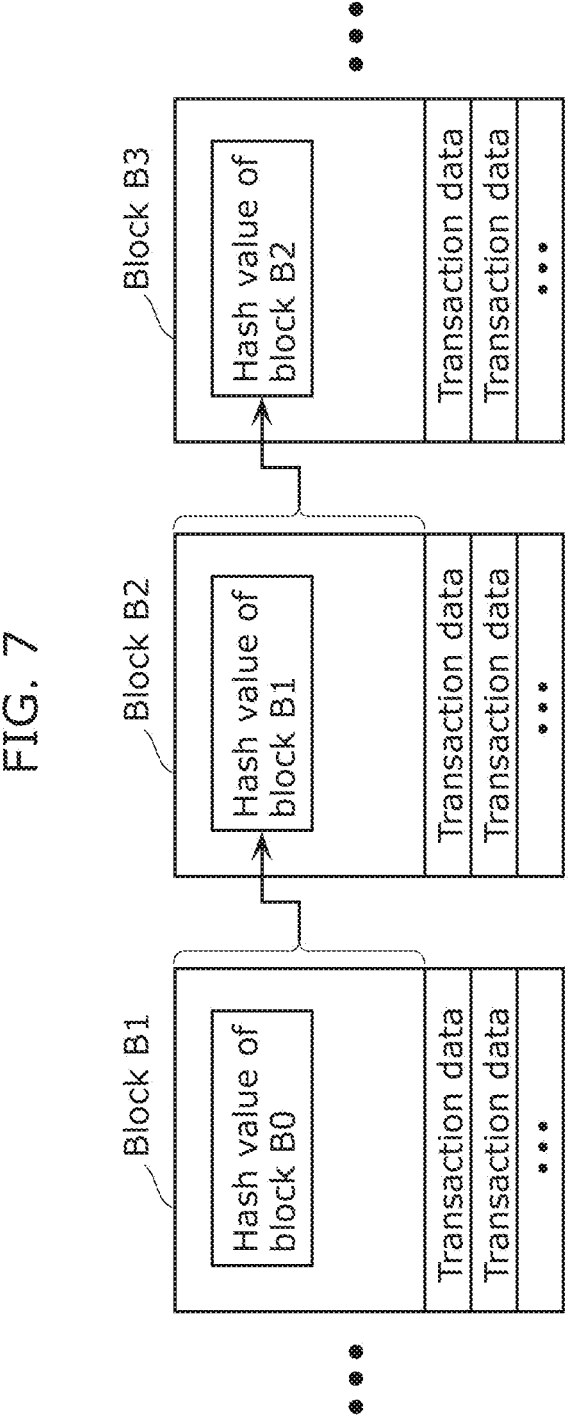
FIG. 7 is an explanatory diagram illustrating the data structure of a blockchain.

FIG. 7 is an explanatory diagram illustrating the data structure of the blockchain.

The blockchain is blocks, each of which is the unit of record, connected in the form of a chain. Each of the blocks includes more than one item of transaction data and the hash value of the immediate previous block. Specifically, block B2 includes the hash value of block B1 located immediately before block B2. A hash value calculated from the more than one item of transaction data included in block B2 and the hash value of block B1 is included into block B3 as the hash value of block B2. In this manner, the blocks are connected in the form of a chain while including the content of the previous blocks into the blocks as the hash values, and thus the connected transaction data is effectively protected from tampering.

If previous transaction data is changed, the hash value of the block becomes different from that before the change, meaning that all subsequent blocks need to be created all over again to make the block tampered with look authentic; this task is extremely difficult in practice <Synchronizer 303>

Synchronizer 303 in each of two or more authentication servers 30 synchronizes the transaction data in the blockchain using a peer-to-peer network. Subsequently, synchronizer 303 records the synchronized transaction data in the blockchain into recorder 304. For example, when transaction data verifier 301 verifies the validity of transaction data, synchronizer 303 transfers the verified transaction data to other authentication servers 30, i.e., authentication servers 30b, 30c. Furthermore, when synchronizer 303 receives the verified transaction data from another authentication server 30, synchronizer 303 records the received, verified transaction data into recorder 304.

<Recorder 304>

Recorder 304 may be, for example, a storage medium including rewritable non-volatile memory such as a hard disk drive or a solid-state drive. Recorder 304 includes the transaction data into a block and records the block into the distributed ledger for authentication server 30a. The distributed ledger may be formed inside recorder 304 or may be formed inside an external storage device for authentication server 30a.

Note that the transaction data includes transaction data obtained from electric vehicle 10, charging station 20, or the like.

In the present exemplary embodiment, when the validity of the transaction data received from electric vehicle 10, charging station 20, or the like is confirmed, recorder 304 records a block including said transaction data into the distributed ledger for authentication server 30a. Similarly, when the validity of the transaction data received from battery manufacturing supplier server 40 or battery recycling supplier server 50, recorder 304 records a block including said transaction data into the distributed ledger for authentication server 30a.

Note that the block in the blockchain that is recorded in the distributed ledger may be made open to battery manufacturing supplier server 40 or battery recycling supplier server 50.

<Communicator 305>

Communicator 305 communicates with electric vehicle 10, charging station 20, battery manufacturing supplier server 40, and battery recycling supplier server 50. Furthermore, communicator 305 communicates with other authentication servers 30. This communication may be performed using the TLS. In this case, communicator 305 may hold a cryptographic key for TLS communication.

[1.5 Configuration of Battery Manufacturing Supplier Server 40]

Battery manufacturing supplier server 40 is one example of a battery evaluation server that is managed by a service provider. The service provider of battery manufacturing supplier server 40 is a business operator that manufactures battery 140. Battery manufacturing supplier server 40 obtains the battery data from the distributed ledger for authentication server 30 and provides a service in which the obtained battery data is used.

One example of the configuration of battery manufacturing supplier server 40 will be described below.

Figure 8:
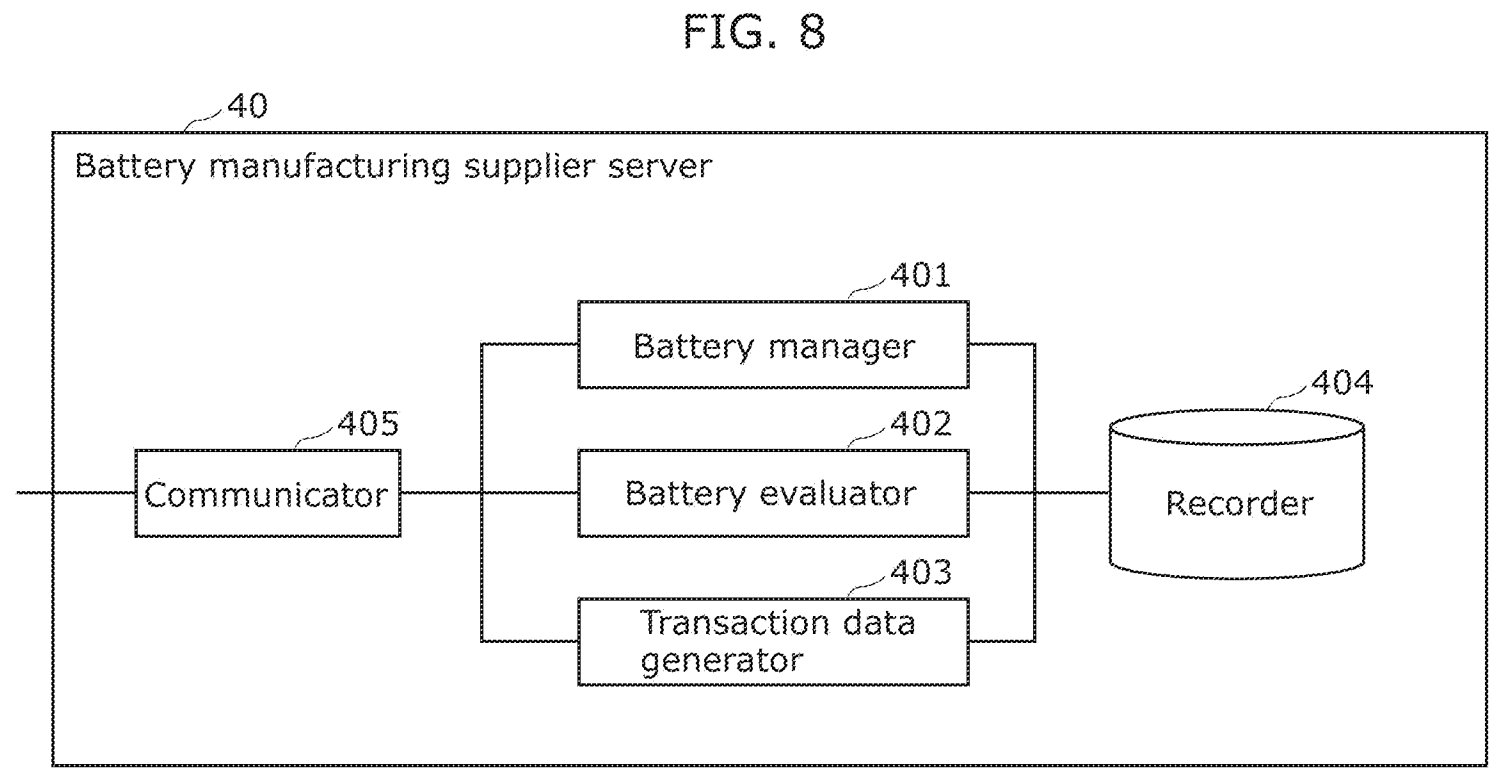

FIG. 8 is a block diagram illustrating one example of the configuration of battery manufacturing supplier server 40 according to the present exemplary embodiment.

Battery manufacturing supplier server 40 includes battery manager 401, battery evaluator 402, transaction data generator 403, recorder 404, and communicator 405, as illustrated in FIG. 8. Battery manufacturing supplier server 40 can be realized by a processor executing a predetermined program using memory. Hereinafter, each structural element will be described.

<Battery Manager 401>

Battery manager 401 manages battery 140 that is used in electric vehicle 10. For example, battery manager 401 manages the battery ID of battery 140 and manages the remaining value of battery 140 evaluated by battery evaluator 402 on the basis of the battery data recorded in the distributed ledger for authentication server 30. Furthermore, for example, battery manager 401 manages the battery ID of battery 140 manufactured and shipped.

Note that when anomalous battery 140 is detected, battery manager 401 may invalidate the battery ID thereof in the management. For example, regarding the battery ID of battery 140 connected to charging station 20 that has been obtained by communicator 405, for example, when two or more identical battery IDs are detected, battery manager 401 can regard the battery ID of said battery 140 as an unauthorized battery ID. In this case, battery manager 401 stores the detected, unauthorized battery ID into recorder 404 as an unauthorized battery ID. In this manner, battery manager 401 can invalidate the battery ID of an anomalous battery in the management.

<Battery Evaluator 402>

Battery evaluator 402 evaluates the state of battery 140 on the basis of the battery data. Battery evaluator 402 obtains, from the distributed ledger for authentication server 30, transaction data related to battery 140 being shipped, and evaluates, for example, the remaining value of said battery 140 using the batter data included in the obtained transaction data.

The battery data includes, for example, the sensor information of battery 140, such as the first sensor information and the second sensor information, the battery ID, and data indicating a battery usage situation such as traveling-time data of electric vehicle 10. The remaining value of battery 140 may be, for example, an estimated value of the battery state such as state of charge (SoC) or state of health (SoH). The SoH, which is an index indicating the degree of degradation, that is, the remaining value of the battery, can be calculated by the remaining capacity (Ah) at the time of degradation/the initial full charge capacity (Ah)×100, for example. The SoC, which is an index indicating the charging status, that is, the remaining battery power, can be calculated by the remaining capacity (Ah)/the full charge capacity (Ah)×100, for example.

Note that the evaluation of the state of battery 140 is not limited to the remaining value and may be the mileage of electric vehicle 10 with battery 140 attached thereto. Furthermore, the state of battery 140 may be automatically evaluated using artificial intelligence (AI) or the like.

<Transaction Data Generator 403>

Transaction data generator 403 generates transaction data in the blockchain.

In the present exemplary embodiment, transaction data generator 403 obtains the evaluation result of the state of battery 140, such as the remaining value, made by battery evaluator 402, for example. Transaction data generator 403 generates transaction data including the obtained the evaluation result and the battery ID of said battery 140. Transaction data generator 403 transmits the generated transaction data to authentication server 30.

Note that transaction data generator 403 may generate the transaction data that further includes the ID of a battery manufacturing supplier that has evaluated said battery 140.

<Recorder 404>

Recorder 404 may be, for example, a storage medium including rewritable non-volatile memory such as a hard disk drive or a solid-state drive. Recorder 404 records the battery ID that is managed by battery manager 401. Recorder 404 may record the evaluation result of the state of battery 140, such as the remaining value, made by battery evaluator 402, for example. Furthermore, recorder 404 records the transaction data generated by transaction data generator 403.

<Communicator 405>

Communicator 405 communicates with electric vehicle 10, charging station 20, and battery recycling supplier server 50. Furthermore, communicator 405 communicates with other authentication servers 30. This communication may be performed using the TLS. In this case, communicator 405 may hold a cryptographic key for TLS communication.

[1.6 Configuration of Battery Recycling Supplier Server 50]

Battery recycling supplier server 50 is one example of a battery evaluation server that is managed by a service provider. The service provider of battery recycling supplier server 50 is a business operator that provides the service of recycling battery 140. Battery recycling supplier server 50 obtains the battery data from the distributed ledger for authentication server 30 and provides the service of recycling battery 140, for example, using the obtained battery data.

One example of the configuration of battery recycling supplier server 50 will be described below.

Figure 9:
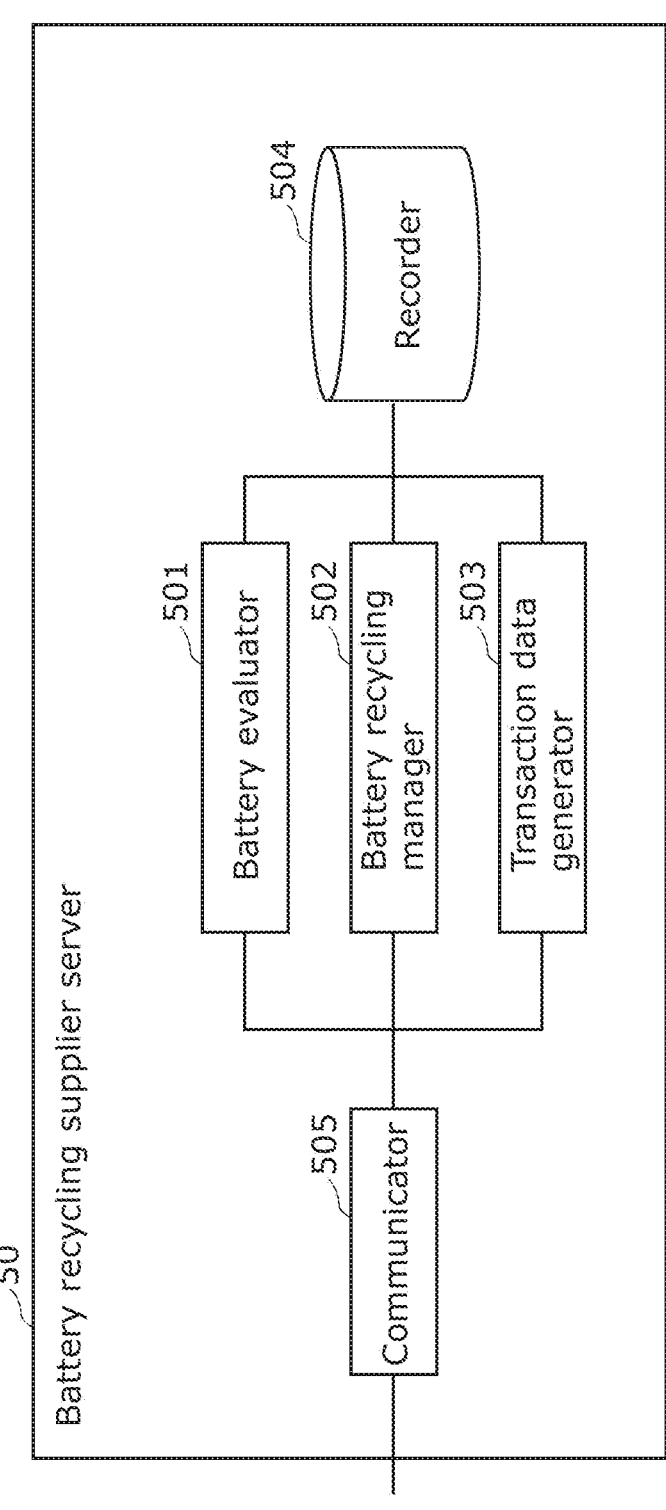
FIG. 9 is a block diagram illustrating one example of the configuration of a battery recycling supplier server according to the exemplary embodiment.

FIG. 9 is a block diagram illustrating one example of the configuration of battery recycling supplier server 50 according to the present exemplary embodiment.

Battery recycling supplier server 50 includes battery evaluator 501, battery recycling manager 502, transaction data generator 503, recorder 504, and communicator 505, as illustrated in FIG. 9. Battery recycling supplier server 50 can be realized by a processor executing a predetermined program using memory. Hereinafter, each structural element will be described.

<Battery Evaluator 501>

Battery evaluator 501 evaluates battery 140. In the present exemplary embodiment, battery evaluator 501 obtains the result of the evaluation made by battery manufacturing supplier server 40 about the state of battery 140 from the distributed ledger for authentication server 30 as the battery data, and evaluates, on the basis of the obtained evaluation result, a method for recycling battery 140. Examples of the evaluation of the recycling method include determining that two or more cells included in battery 140 can be recycled, determining that only some of the cells can be recycled because the cells are partially degraded, and determining that the cells are not usable per se, but the materials of the cells can only be recycled. The evaluation of the recycling method may be determining the battery as not being usable in a large or medium-sized electric vehicle 10, which requires high output power, but being usable in an electric vehicle that only requires low output power, such as a motorized bicycle, or for a storage battery application for housing.

Note that battery evaluator 501 is not limited to obtaining an evaluation result of the state of battery 140, such as the remaining value, from the distributed ledger for authentication server 30, but may evaluate the state of battery 140 by itself. Specifically, battery evaluator 501 may obtain, from the distributed ledger for authentication server 30, transaction data related to said battery 140, and evaluate, for example, the remaining value of said battery 140 using the batter data included in the obtained transaction data.

<Battery Recycling Manager 502>

Battery recycling manager 502 determines, on the basis of the evaluation result of battery 140 made by battery evaluator 501, whether to recycle battery 140. When battery recycling manager 502 determines that battery 140 is to be recycled, battery recycling manager 502 determines, on the basis of the recycling method evaluated by battery evaluator 501, a method for recycling battery 140. For example, battery recycling manager 502 determines a method for recycling battery 140 such as reusing the cells included in battery 140 or disassembling battery 140 and taking out and recycling only the materials thereof.

Battery recycling manager 502 records, into recorder 504, the result of the determination about battery 140 and the battery ID or the ID of a cell and manages the method for recycling battery 140.

<Transaction Data Generator 503>

Transaction data generator 503 generates transaction data in the blockchain.

In the present exemplary embodiment, transaction data generator 503 obtains the result of the determination made by battery recycling manager 502 about battery 140. Transaction data generator 503 generates transaction data on the basis of the obtained result of the determination. For example, when the obtained result of the determination indicates that the cells of battery 140 are to be recycled, it is sufficient that transaction data generator 503 generate transaction data including the ID of the battery to be recycled and the ID of each of the cells thereof.

Transaction data generator 503 transmits the generated transaction data to authentication server 30.

Note that transaction data generator 503 may generate the transaction data that further includes the ID of a battery recycling supplier that has evaluated said battery 140. Furthermore, transaction data generator 503 may generate the transaction data that further includes at least one of the evaluation result made by battery evaluator 501, the recycling method, the sensor information corresponding to the battery ID used in the evaluation by battery evaluator 501, and the like.

<Recorder 504>

Recorder 504 may be, for example, a storage medium including rewritable non-volatile memory such as a hard disk drive or a solid-state drive. Recorder 504 records the ID of the cell and/or the battery ID of battery 140 determined to be recycled. Furthermore, recorder 504 may record the remaining value, etc., of battery 140 used to determine that battery 140 is to be recycled.

Furthermore, recorder 504 records the transaction data generated by transaction data generator 503.

<Communicator 505>

Communicator 505 communicates with electric vehicle 10, charging station 20, and battery manufacturing supplier server 40. Furthermore, communicator 405 communicates with other authentication servers 30. This communication may be performed using the TLS. In this case, communicator 505 may hold a cryptographic key for TLS communication.

[1.7 Configuration of Charging Equipment 60]

Charging equipment 60 charges battery 140 removed from electric vehicle 10 or charges, via an accessory charger for electric vehicle 10, battery 140 attached to electric vehicle 10, for example. In this case, battery 140 may record, for example, the number of times of charging, the amount of charging, and information of charging equipment 60 that has charged battery 140 into recorder 1105 of vehicle manager 110 as battery data.

The information of charging equipment 60 may include, for example, the location at which charging equipment 60 is installed, the length of time taken to charge battery 140, the date and time of charging, and information indicating whether the charging of battery 140 is fast charging or slow charging. In the case where electric vehicle 10 or battery 140 can obtain position information indicating the position thereof, such as global positioning system (GPS) information, battery 140 may store the position information of electric vehicle 10 or battery 140 as the information of charging equipment 60 upon charging.

Note that when charging equipment 60 determines that the charging of battery 140 is anomalous, charging equipment 60 may stop charging said battery 140. Examples of the anomalous charging may include charging at a voltage greater than a predetermined voltage, charging with an electric current greater than a predetermined electric current, and charging at a temperature lower than a predetermined temperature (air temperature).

[1.8 Charging-Time Process]

The following describes the authentication process performed between battery 140 and charging station 20 and the charging-time process performed between battery 140, charging station 20, and authentication servers 30a to 30c.

Figure 10:
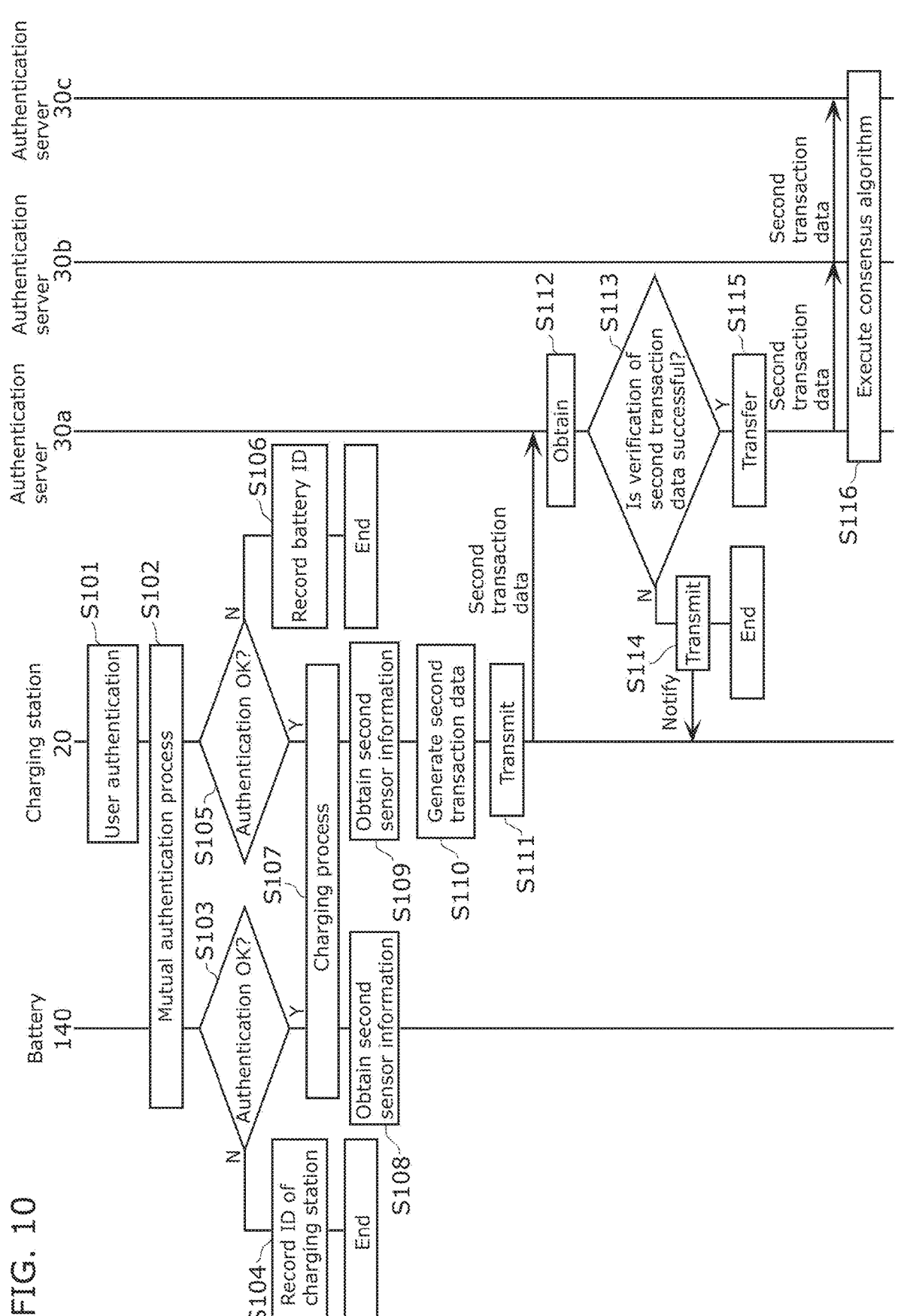
FIG. 10 is a sequence chart illustrating an authentication process performed between a battery and a charging station and a charging-time process performed between the charging station and authentication servers according to the exemplary embodiment.

FIG. 10 is a sequence chart illustrating the authentication process performed between battery 140 and charging station 20 and the charging-time process performed between charging station 20 and authentication servers 30a to 30c according to the present exemplary embodiment.

First, charging station 20 authenticates a user who has come to replace battery 140 (S101). When charging station 20 determines that the user is an authorized user, charging station 20 unlocks a door to a charging space where already-charged battery 140 is placed in charging station 20, to permit opening of the door. This allows the user to replace battery 140 used in electric vehicle 10 by already-charged battery 140 placed in the charging space with the door unlocked.

Next, when the user stores, into charging station 20, battery 140 used in electric vehicle 10, charging station 20 and battery 140 perform a mutual authentication process between battery 140 newly placed in the charging space and charging station 20 (S102).

Next, battery 140 determines whether the authentication between battery 140 and charging station 20 is successful (S103). When the authentication between battery 140 and charging station 20 is unsuccessful in Step S103 (N in S103), battery 140 records the ID of said charging station 20 (S104) and ends the processing without charging.

On the other hand, charging station 20 determines whether the authentication between charging station 20 and battery 140 is successful (S105). When the authentication between charging station 20 and battery 140 is unsuccessful in Step S105 (N in S105), charging station 20 records the battery ID of said battery 140 (S106) and ends the processing without charging said battery 140.

When the authentication between battery 140 and charging station 20 is successful in Steps S103 and S105 (Y in S103 and Y in S105), the process of charging battery 140 is performed.

Next, battery 140 obtains the second sensor information from charging station 20 (S108) and records the second sensor information. Note that the second sensor information is, for example, the amount of charging performed at charging station 20, and the temperature, the electric current, the voltage, and the impedance measured upon charging, and may further include the number of times of charging.

Next, charging station 20 obtains the second sensor information from battery 140 (S109) and records the second sensor information. Note that the second sensor information is, for example, the amount of charging performed at charging station 20, and the temperature, the electric current, the voltage, and the impedance measured upon charging, and may further include the number of times of charging.

Next, charging station 20 generates transaction data (hereinafter referred to as second transaction data) including the second sensor information obtained in Step S109 and the battery ID of said battery 140 (S110). Note that the second transaction data may include the ID of charging station 20 other than the second sensor information and the battery ID as mentioned above.

Next, charging station 20 transmits, to authentication server 30a, the second transaction data generated in Step S110 (S111). Note that in the example illustrated in FIG. 10, charging station 20 transmits the generated second transaction data to authentication server 30a, but charging station 20 may transmit the generated second transaction data to authentication server 30b or authentication server 30c. When the generated second transaction data is transmitted to authentication server 30b or authentication server 30c, the processing is substantially the same.

Next, when authentication server 30a obtains the second transaction data from charging station 20 (S112), authentication server 30a verifies the obtained second transaction data (S113).

When the verification of said second transaction data is unsuccessful in Step S113 (N in S113), authentication server 30a transmits notification of the result to charging station 20 (S114).

On the other hand, when the verification of said second transaction data is successful in Step S113 (Y in S113), authentication server 30a transfers said second transaction data to other authentication servers 30 (authentication servers 30b, 30c) (S115). Note that other authentication servers 30 also verify said second transaction data transferred thereto.

Next, authentication server 30a, authentication server 30b, and authentication server 30c execute the consensus algorithm (S116). When authentication server 30a, authentication server 30b, and authentication server 30c verify that said second transaction data is valid (in other words, verify the validity of said second transaction data), each of authentication server 30a, authentication server 30b, and authentication server 30c generates a block including said second transaction data. Subsequently, authentication servers 30a, 30*b*, 30*c* record the blocks each including said second transaction data into the distributed ledger.

Thus, the second sensor information and the battery ID of battery 140 charged are recorded into the distributed ledger as battery data in a manner that precludes tampering. Note that in order to record, into the distributed ledger, the second sensor information and the battery ID of battery 140 charged, the charging-time process is essential, but the authentication processes shown in Steps S101 to S106 are not essential.

[1.9 Authentication Process between Battery 140 and Electric Vehicle 10 and Traveling-time Process]

The following describes the authentication process performed between battery 140 and electric vehicle 10 and the traveling-time process performed between battery 140, electric vehicle 10, and authentication servers 30*a* to 30*c*.

Figure 11:
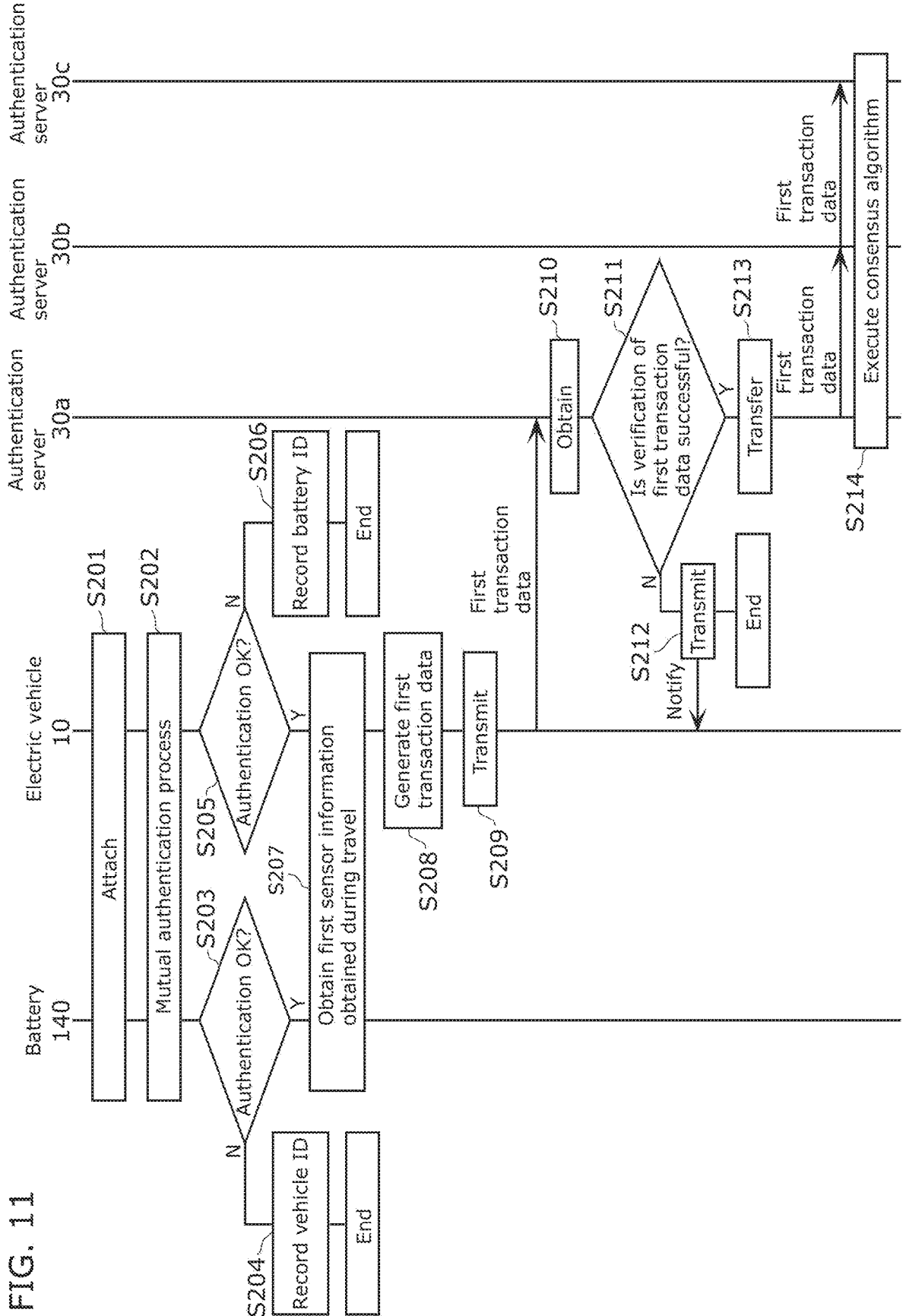
FIG. 11 is a sequence chart illustrating an authentication process performed between a battery and an electric vehicle and a traveling-time process performed between the electric vehicle and authentication servers according to the exemplary embodiment.

FIG. 11 is a sequence chart illustrating the authentication process performed between battery 140 and electric vehicle 10 and the traveling-time process performed between electric vehicle 10 and authentication servers 30*a* to 30*c* according to the present exemplary variation.

First, a user attaches battery 140 to electric vehicle 10 (S201). Accordingly, battery 140 and electric vehicle 10 detect the attachment of battery 140 to battery connector 120 of electric vehicle 10. Note that battery 140 may detect the connection to battery connector 120 of electric vehicle 10 by detecting electric power supply to electric vehicle 10. Similarly, electric vehicle 10 may detect the connection to battery connector 120 of electric vehicle 10 by detecting electric power supply from battery 140.

Next, battery 140 and electric vehicle 10 perform mutual authentication (S202).

Next, battery 140 determines whether the authentication between battery 140 and electric vehicle 10 is successful (S203). When the authentication between battery 140 and electric vehicle 10 is unsuccessful in Step S203 (N in S203), battery 140 determines that said electric vehicle 10 is anomalous, records the vehicle ID of said electric vehicle 10 (S204) and ends the processing without permitting discharges toward electric vehicle 10.

On the other hand, electric vehicle 10 determines whether the authentication between electric vehicle 10 and battery 140 is successful (S205). When the authentication between electric vehicle 10 and battery 140 is unsuccessful in Step S205 (N in S205), electric vehicle 10 determines that said battery 140 is anomalous, records the battery ID of said battery 140 (S206) and ends the processing without permitting the start of electric vehicle 10.

When the authentication between battery 140 and electric vehicle 10 is successful in Step S203 (Y in S203), battery 140 permits discharges toward electric vehicle 10. Similarly, when the authentication between battery 140 and electric vehicle 10 is successful in Step S205 (Y in S205), electric vehicle 10 permits the start of electric vehicle 10. Subsequently, when electric vehicle 10 travels, battery 140 and electric vehicle 10 obtain the first sensor information about battery 140, which is obtained during travel (S207). The first sensor information includes the amount of discharging, the voltage, the electric current, the temperature, and the like that are measured during travel, but this is not limiting. The first sensor information may include the impedance at battery 140 measured during travel or may include the acceleration information of electric vehicle 10.

Next, electric vehicle 10 generates transaction data (hereinafter referred to as first transaction data) including the first sensor information obtained in Step S207 and the battery ID of said battery 140 (S208). Note that the first transaction data may include the vehicle ID of electric vehicle 10 and the travel data of electric vehicle 10 other than the first sensor information and the battery ID as mentioned above.

Next, electric vehicle 10 transmits, to authentication server 30*a*, the first transaction data generated in Step S208 (S209). Note that in the example illustrated in FIG. 11, electric vehicle 10 transmits the generated first transaction data to authentication server 30*a*, but electric vehicle 10 may transmit the generated first transaction data to authentication server 30*b* or authentication server 30*c*. When the generated first transaction data is transmitted to authentication server 30*b* or authentication server 30*c*, the processing is substantially the same.

Next, when authentication server 30*a* obtains the first transaction data from electric vehicle 10 (S210), authentication server 30*a* verifies the obtained first transaction data (S211).

When the verification of said first transaction data is unsuccessful in Step S211 (N in S211), authentication server 30*a* transmits notification of the result to electric vehicle 10 (S212).

On the other hand, when the verification of said first transaction data is successful in Step S211 (Y in S211), authentication server 30*a* transfers said first transaction data to other authentication servers 30 (authentication servers 30*b*, 30*c*) (S213). Note that other authentication servers 30 also verify said first transaction data transferred thereto.

Next, authentication server 30*a*, authentication server 30*b*, and authentication server 30*c* execute the consensus algorithm (S214). When authentication server 30*a*, authentication server 30*b*, and authentication server 30*c* verify that said first transaction data is valid (in other words, verify the validity of said first transaction data), each of authentication server 30*a*, authentication server 30*b*, and authentication server 30*c* generates a block including said first transaction data. Subsequently, authentication servers 30*a*, 30*b*, 30*c* record the blocks each including said first transaction data into the distributed ledger.

Thus, the first sensor information and the battery ID of battery 140 obtained during travel are recorded into the distributed ledger as battery data in a manner that precludes tampering.

Note that in order to record the first sensor information of battery 140, which is obtained during travel, into the distributed ledger, the traveling-time process is essential, but the authentication processes shown in Steps S201 to S206 are not essential.

Furthermore, the processes in Steps S207 and S208 may be repeatedly performed on a regular or irregular basis. Alternatively, the process in Step S208 may be performed once while the process in Step S207 is repeatedly performed on a regular or irregular basis. In this case, it is sufficient that electric vehicle 10 include, into one first transaction data, the first sensor information obtained during travel between the start and the end of electric vehicle 10 with said battery 140 attached thereto and transmit the first transaction data to authentication server 30. Thus, the first sensor information of battery 140, which is obtained during travel, may include two or more amounts of discharging, two or more voltages, two or more electric currents, two or more temperatures, and the like that are obtained during the period of travel of electric vehicle 10, or may mean two or more items of the first sensor information that are obtained during the period of travel of electric vehicle 10.

Furthermore, the foregoing describes the case where the mutual authentication process in Step S202 is performed when battery 140 is attached to electric vehicle 10, but this is not limiting. The mutual authentication process may be performed when electric vehicle 10 is started.

[1.10 Battery Evaluation-Time Process]

The following describes a battery evaluation-time process performed between battery manufacturing supplier server 40 and authentication servers 30*a* to 30*c*.

Figure 12:
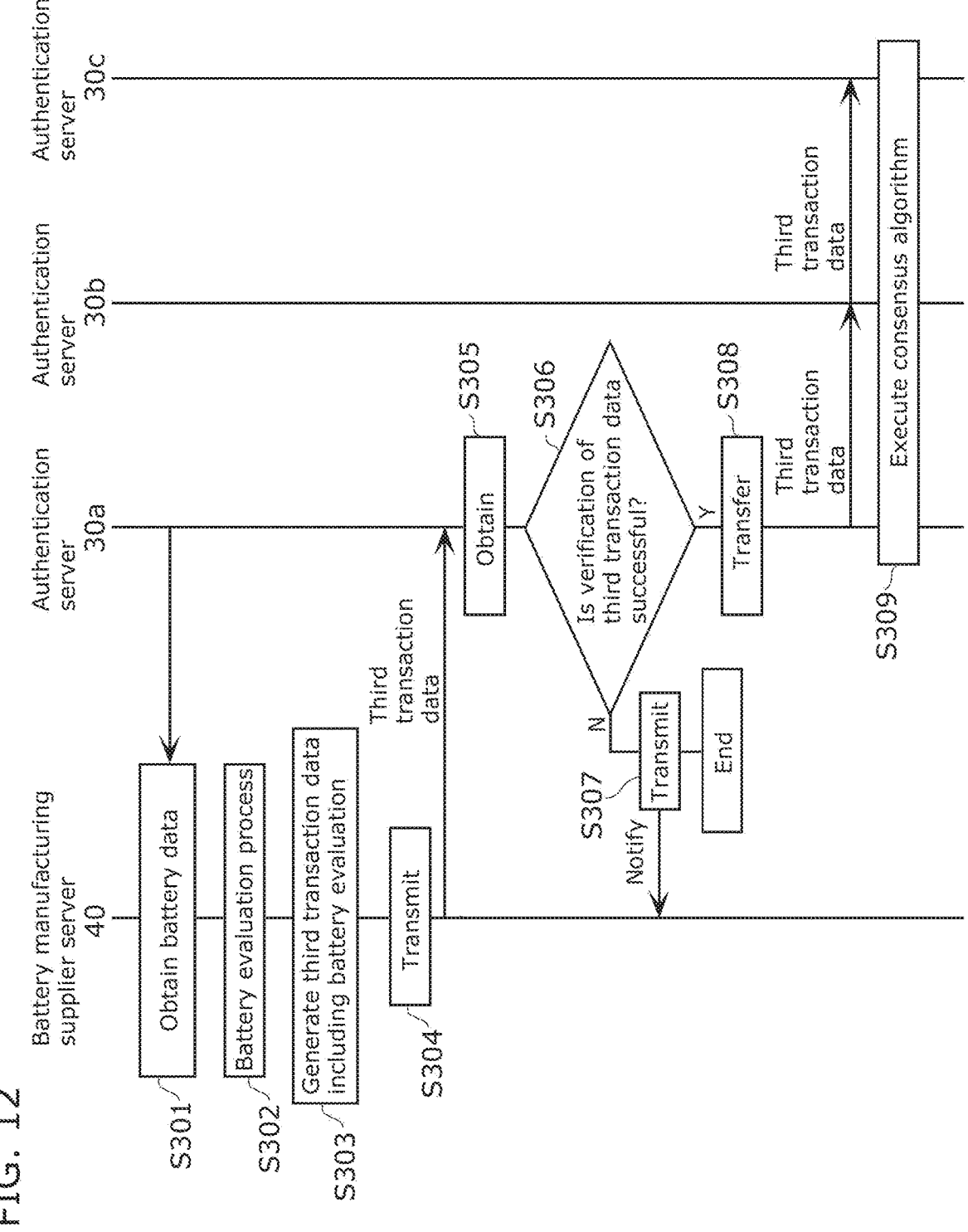
FIG. 12 is a sequence chart of a battery-evaluation-time process performed between a battery manufacturing supplier server and authentication servers according to the exemplary embodiment.

FIG. 12 is a sequence chart of the battery-evaluation-time process performed between battery manufacturing supplier server 40 and authentication servers 30*a* to 30*c* according to the present exemplary embodiment.

First, battery manufacturing supplier server 40 obtains the battery data of target battery 140 from the distributed ledger for authentication server 30*a* (S301). Specifically, first, battery manufacturing supplier server 40 generates a request to authentication server 30*a* to obtain the battery data of target battery 140. The battery data herein includes, for example, the battery ID and the sensor information of battery 140, such as the first sensor information and the second sensor information, but may further include the amount of charging, the number of times of charging, and the like. Furthermore, in the obtainment request, the battery ID of target battery 140 may be specified, or the transaction data including the battery data of target battery 140 may be specified. Moreover, in the obtainment request, all data of target battery 140 recorded in the distributed ledger for authentication server 30*a* may be specified. Subsequently, battery manufacturing supplier server 40 transmits the generated obtainment request to authentication server 30*a* and obtains the battery data of target battery 140 from the distributed ledger for authentication server 30*a*. Note that in the example illustrated in FIG. 12, battery manufacturing supplier server 40 obtains the battery data of target battery 140 from authentication server 30*a*, but battery manufacturing supplier server may obtain the battery data of target battery 140 from authentication server 30*b* or authentication server 30*c*. When battery manufacturing supplier server 40 obtains the battery data of target battery 140 from authentication server 30*b* or authentication server 30*c*, the processing is substantially the same. Furthermore, battery manufacturing supplier server 40 may generate transaction data indicating that the battery data of target battery 140 has been obtained from the distributed ledger for authentication server 30*a*, and record the generated transaction data into the distributed ledger for authentication servers 30*a* to 30*c*.

Next, battery manufacturing supplier server 40 performs a battery evaluation process on said battery on the basis of the battery data obtained from authentication server 30*a* (S302) and obtains the evaluation of said battery 140. In the present exemplary embodiment, battery manufacturing supplier server 40 performs the battery evaluation process in which the state of battery 140 such as the remaining value of battery 140 is evaluated using the battery data, and thus obtains the battery evaluation of said battery 140. The details are as described above and as such, description thereof will be omitted.

Next, battery manufacturing supplier server 40 generates transaction data (hereinafter referred to as third transaction data) including the battery evaluation of said battery 140 obtained in Step S302 and the battery ID of said battery 140 (S303).

Next, battery manufacturing supplier server 40 transmits, to authentication server 30*a*, the third transaction data generated in Step S303 (S304). Note that in the example illustrated in FIG. 12, battery manufacturing supplier server 40 transmits the generated third transaction data to authentication server 30*a*, but battery manufacturing supplier server 40 may transmit the generated third transaction data to authentication server 30*b* or authentication server 30*c*. When battery manufacturing supplier server 40 transmits the generated third transaction data to authentication server 30*b* or authentication server 30*c*, the processing is substantially the same.

Next, when authentication server 30*a* obtains the third transaction data from battery manufacturing supplier server 40 (S305), authentication server 30*a* verifies the obtained third transaction data (S306).

When the verification of said third transaction data is unsuccessful in Step S306 (N in S306), authentication server 30*a* transmits notification of the result to battery manufacturing supplier server 40 (S307).

On the other hand, when the verification of said third transaction data is successful in Step S306 (Y in S306), authentication server 30*a* transfers said third transaction data to other authentication servers 30 (authentication servers 30*b*, 30*c*) (S308). Note that other authentication servers 30 also verify said third transaction data transferred thereto.

Next, authentication server 30*a*, authentication server 30*b*, and authentication server 30*c* execute the consensus algorithm (S309). When authentication server 30*a*, authentication server 30*b*, and authentication server 30*c* verify that said third transaction data is valid (in other words, verify the validity of said third transaction data), each of authentication server 30*a*, authentication server 30*b*, and authentication server 30*c* generates a block including said third transaction data. Subsequently, authentication servers 30*a*, 30*b*, 30*c* record the blocks each including said third transaction data into the distributed ledger.

Thus, the evaluation result of battery 140 made by battery manufacturing supplier server 40 is recorded into the distributed ledger as the battery data of battery 140 in a manner that precludes tampering.

[1.11 Battery-Recycling-Time Process]

The following describes a battery-recycling-time process performed between battery recycling supplier server 50 and authentication servers 30*a* to 30*c*.

Figure 13:
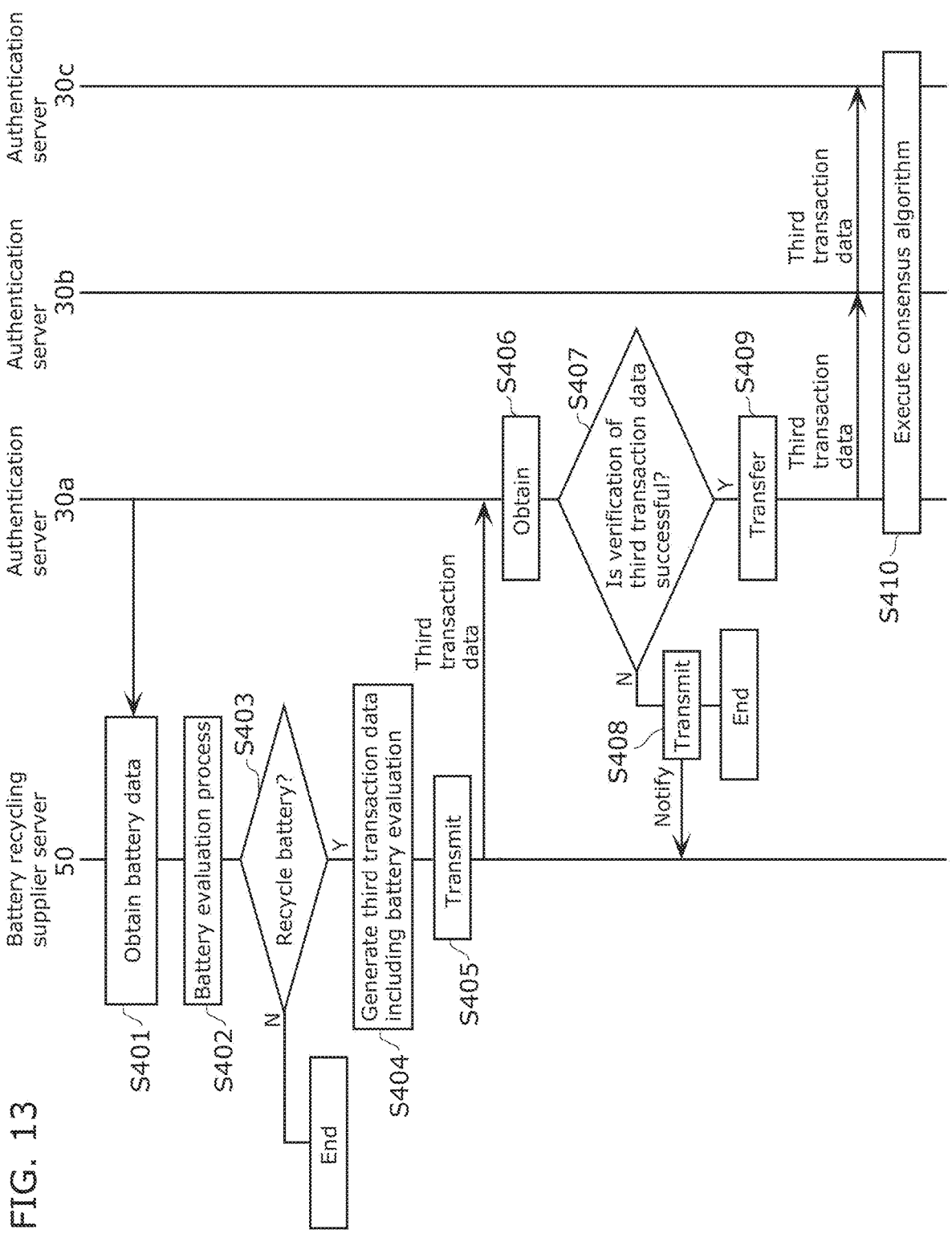
FIG. 13 is a sequence chart of a battery-recycling-time process performed between a battery manufacturing supplier server and authentication servers according to the exemplary embodiment.

FIG. 13 is a sequence chart of the battery-recycling-time process performed between battery recycling supplier server 50 and authentication servers 30*a* to 30*c* according to the present exemplary embodiment.

First, battery recycling supplier server 50 obtains the battery data of target battery 140 from the distributed ledger for authentication server 30*a* (S401). Specifically, first, battery recycling supplier server 50 generates a request to authentication server 30*a* to obtain the battery data of target battery 140. The battery data herein includes the evaluation information of battery 140, the sensor information of battery 140 that includes the amount of charging, such as the first sensor information and the second sensor information, and the battery ID of battery 140. Furthermore, in the obtainment request, the battery ID of target battery 140 may be specified, or the transaction data including the battery data of target battery 140 may be specified. Moreover, in the obtainment request, all data of target battery 140 recorded in the distributed ledger for authentication server 30*a* may be specified. Subsequently, battery recycling supplier server 50 transmits the generated obtainment request to authentication server 30*a* and obtains the battery data of target battery 140 from the distributed ledger for authentication server 30*a*. Note that in the example illustrated in FIG. 13, battery recycling supplier server 50 obtains the battery data of target battery 140 from authentication server 30*a*, but battery recycling supplier server 50 may obtain the battery data of target battery 140 from authentication server 30*b* or authentication server 30*c*. When battery recycling supplier server 50 obtains the battery data of target battery 140 from authentication server 30b or authentication server 30c, the processing is substantially the same. Furthermore, battery recycling supplier server 50 may generate transaction data indicating that the battery data of target battery 140 has been obtained from the distributed ledger for authentication server 30a, and record the generated transaction data into the distributed ledger for authentication servers 30a to 30c.

Next, battery recycling supplier server 50 performs a battery evaluation process on said battery on the basis of the battery data obtained from authentication server 30a (S402) and obtains the battery evaluation of said battery 140. In the present exemplary embodiment, battery recycling supplier server 50 performs the evaluation process in which, using the battery data, whether to recycle battery 140 is evaluated, and a recycling method to be applied when said battery 140 is to be recycled is evaluated, and thus obtains the battery evaluation of said battery 140. The details are as described above and as such, description thereof will be omitted. Note that the evaluation of whether to recycle battery 140 includes evaluation of whether there is any battery 140 to be recycled.

Next, on the basis of the battery evaluation of said battery 140 obtained in Step S402, battery recycling supplier server 50 determines whether to recycle battery 140 (S403).

When it is determined in Step S403 that battery 140 is not to be recycled (N in S403), the processing ends.

On the other hand, when it is determined in Step S403 that battery 140 is to be recycled (Y in S403), battery recycling supplier server 50 generates the third transaction data including the battery evaluation of said battery 140 obtained in Step S402 (S404). Note that this battery evaluation may include information indicating that battery 140 is to be recycled, the recycling method, the ID of a cell and the battery ID of said battery 140, for example, or may include only the ID of a cell and the battery ID of battery 140 to be recycled.

Next, battery recycling supplier server 50 transmits, to authentication server 30a, the third transaction data generated in Step S404 (S405). Note that in the example illustrated in FIG. 13, battery recycling supplier server 50 transmits the generated third transaction data to authentication server 30a, but battery recycling supplier server 50 may transmit the generated third transaction data to authentication server 30b or authentication server 30c. When battery recycling supplier server 50 transmits the generated third transaction data to authentication server 30b or authentication server 30c, the processing is substantially the same.

Next, when authentication server 30a obtains the third transaction data from battery recycling supplier server 50 (S406), authentication server 30a verifies the obtained third transaction data (S407).

When the verification of said third transaction data is unsuccessful in Step S407 (N in S407), authentication server 30a transmits notification of the result to battery recycling supplier server 50 (S408).

On the other hand, when the verification of said third transaction data is successful in Step S407 (Y in S407), authentication server 30a transfers said third transaction data to other authentication servers 30 (authentication servers 30b, 30c) (S409). Note that other authentication servers 30 also verify said third transaction data transferred thereto.

Next, authentication server 30a, authentication server 30b, and authentication server 30c execute the consensus algorithm (S410). When authentication server 30a, authentication server 30b, and authentication server 30c verify that said third transaction data is valid (in other words, verify the validity of said third transaction data), each of authentication server 30a, authentication server 30b, and authentication server 30c generates a block including said third transaction data. Subsequently, authentication servers 30a, 30b, 30c record the blocks each including said third transaction data into the distributed ledger.

Thus, the evaluation result of battery 140 made by battery recycling supplier server 50 is recorded into the distributed ledger as the battery data of battery 140 in a manner that precludes tampering.

[1.12 Advantageous Effects, Etc., of Exemplary Embodiment]

As described above, with the battery data management method, etc., according to the present exemplary embodiment, the battery data is recorded from normal battery 140, electric vehicle 10, or charging station 20 into the distributed ledger via authentication server 30 and thus, it is possible to prevent the battery data from being tampered with. In other words, with the battery data management method, etc., according to the present exemplary embodiment, the battery data in electric vehicle 10 can be managed using the blockchain technology in a manner that precludes tampering.

Furthermore, when the battery data is recorded into the distributed ledger, the credibility of said data can be ensured. Thus, a service provider such as a battery manufacturer or recycling company can use the battery data without fear and therefore can provide the service of battery evaluation of the state of the battery, the remaining value thereof, the recycling method thereof, and the like, for example.

Furthermore, it is possible to prevent the battery evaluation from being tampered with by recording the battery evaluation into the distributed ledger as battery data from a server that is used by a service provider such as a battery manufacturer or recycling company. Thus, the battery data can be safely shared via authentication server 30 among companies that wish to use the battery data. This allows the battery data to be used not only to evaluate used electric vehicle 10, but also at the time of recycling battery 140. Furthermore, the use of the battery data including the batter evaluation allows individual batteries 140 to be effectively used, for example, when batteries 140 degrading fast are used for devices other than electric vehicle 10 at proper timing and thus, each battery 140 can be used in a way that is appropriate for said battery 140.

Furthermore, according to the present exemplary embodiment, it is possible to exclude anomalous batteries through the mutual authentication between each battery and the charging station or the mutual authentication between each battery and the electric vehicle.

[2. Other Variations]

Note that the present disclosure has been described thus far based on the above exemplary embodiment, but it goes without saying that the present disclosure is not limited to the above exemplary embodiment. The present disclosure also includes cases such as those described below.

Figure 14:
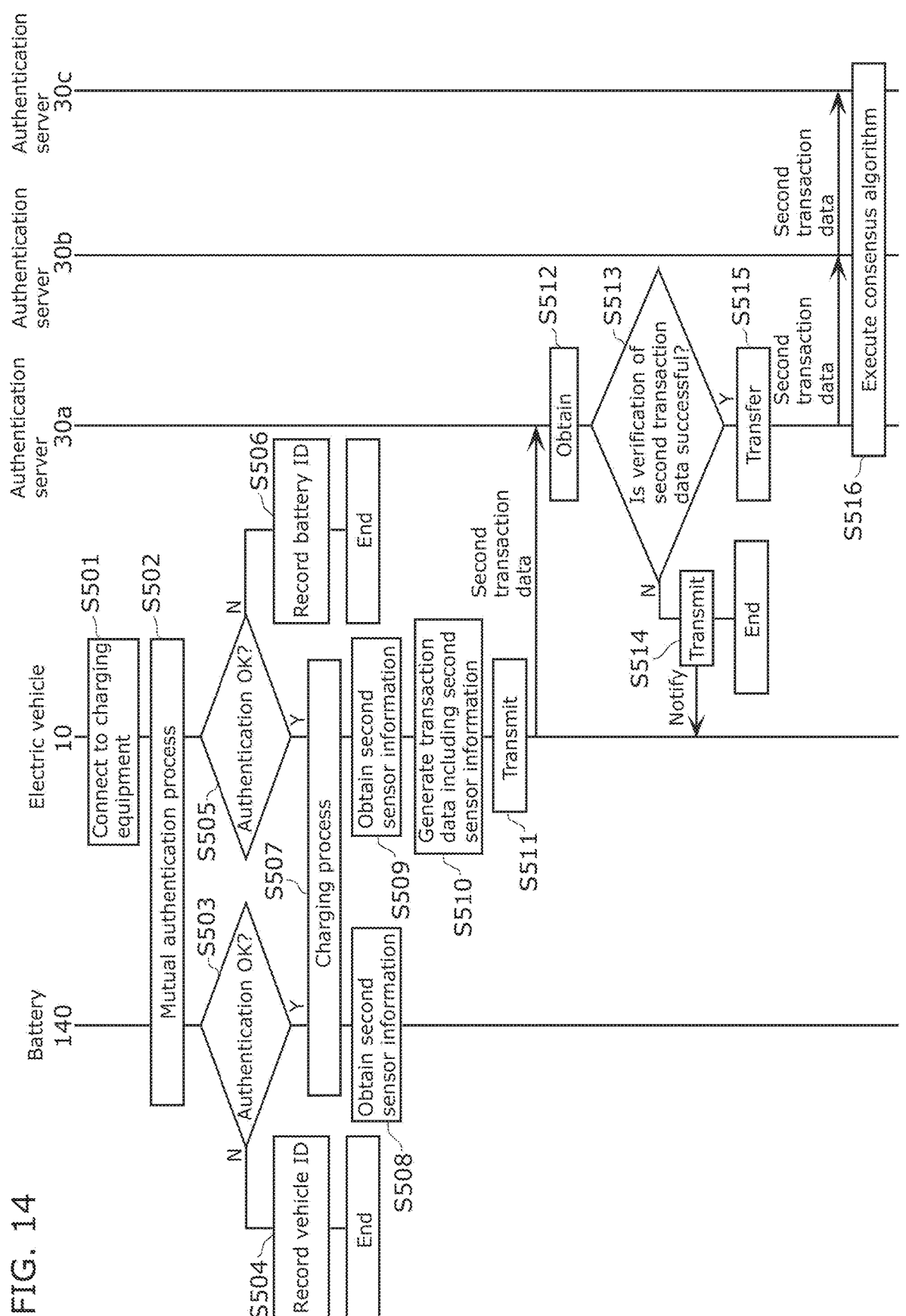
FIG. 14 is a sequence chart illustrating an authentication process performed between a battery and an electric vehicle and a charging-time process performed between the electric vehicle and authentication servers according to a variation.

(1) In the above exemplary embodiment, as described in Step S107 in FIG. 10, for example, charging station 20 charges battery 140, but this is not limiting. Charging equipment 60 may charge battery 140. With reference to FIG. 14, the following describes the case where electric vehicle 10 is connected to charging equipment 60 and battery 140 is charged.

FIG. 14 is a sequence chart illustrating an authentication process performed between battery 140 and electric vehicle 10 and a charging-time process performed between electric vehicle 10 and authentication servers 30a to 30c according to a variation.

First, a user connects electric vehicle 10 to charging equipment 60 (S501). Then, electric vehicle 10 detects connection thereof (of electric vehicle 10) to charging equipment 60.

Next, battery 140 and electric vehicle 10 perform mutual authentication (S502).

Next, battery 140 determines whether the authentication between battery 140 and electric vehicle 10 is successful (S503). When the authentication between battery 140 and electric vehicle 10 is unsuccessful in Step S503 (N in S503), battery 140 determines that said electric vehicle 10 is anomalous, records the vehicle ID of said electric vehicle 10 (S504) and ends the processing without charging.

Note that the subsequent processes, specifically, the processes in Steps S505 to S516, are substantially the same as the processes in Steps S105 to S116 in FIG. 10 and as such, description thereof will be omitted.

Thus, the second sensor information of battery 140 charged by charging equipment 60 is recorded into the distributed ledger in a manner that preludes tampering, and therefore battery data including the second sensor information is secured. Thus, the battery data including the second sensor information can be used without fear.

(2) In the above exemplary embodiment, authentication server 30, battery manufacturing supplier server 40, and battery recycling supplier server 50 are described as separate servers, but this is not limiting. Battery manufacturing supplier server 40 and/or battery recycling supplier server 50 may have the functions of authentication server 30.

(3) In the above exemplary embodiment, the battery ID, the ID of charging station 20, and the vehicle ID are used, but this is not limiting; the IDs stated in certificates for cryptographic keys may be used as the battery ID, the ID of charging station 20, and the vehicle ID.

(4) In the above exemplary embodiment, as illustrated in FIG. 11 and FIG. 14, for example, electric vehicle 10 transmits the transaction data to authentication server 30, but this is not limiting. When electric vehicle 10 is not connected to communication network 70, the generated transaction data may be recorded in battery 140 attached to electric vehicle 10. In this case, at the time of being charged at charging station 20, said battery 140 may transmit the recorded transaction data to authentication server 30 via charging station 20. Thus, the battery data including the first sensor information and/or the second sensor information when electric vehicle 10 is not connected to communication network 70 can also be recorded into the distributed ledger in a manner that precludes tampering.

(5) In the above exemplary embodiment, as illustrated in FIG. 10, FIG. 11, and FIG. 14, for example, electric vehicle 10 or charging station 20 generates the transaction data, but this is not limiting. When battery 140 includes the transaction data generator, battery 140 may generate transaction data including the first sensor information and/or the second sensor information and transmit the transaction data to authentication server 30 via electric vehicle 10 or charging station 20.

(6) Each of the devices according to the above exemplary embodiment is specifically a computer system configured of a microprocessor, read-only memory (ROM), random-access memory (RAM), a hard disk unit, a display unit, a keyboard, and a mouse, for example. A computer program is recorded on the RAM or the hard disk unit. Each of the devices achieves its function as a result of the microprocessor operating according to the computer program. Here, the computer program is configured of a combination of command codes indicating commands to the computer in order to achieve a predetermined function.

(7) Some or all of the structural elements included in each of the devices according to the above exemplary embodiment may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is recorded on the RAM. The system LSI achieves its function as a result of the microprocessor operating according to the computer program.

Furthermore, each unit of the structural elements included in each of the devices described above may be individually configured into a single chip, or some or all of the units may be configured into a single chip.

Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(8) Some or all of the structural elements included in each of the devices described above may be implemented as a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions by way of the microprocessor operating according to the computer program. The IC card and the module may be tamperproof.

(9) The present disclosure may be the above-described methods. Furthermore, the present disclosure may be a computer program for implementing these methods using a computer or may be a digital signal of the computer program.

Furthermore, the present disclosure may be a computer program or a digital signal recorded on a computer-readable recording medium, such as a flexible disk, a hard disk, CD-ROM, a magneto-optical disc (MO), a digital versatile disc (DVD), DVD-ROM, DVD-RAM, a Blu-ray (registered trademark) disc (BD), or semiconductor memory, for example. The present disclosure may also be the digital signal recorded on these recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and memory. The memory may have the computer program recorded therein, and the microprocessor may operate according to the computer program.

Moreover, by transferring the recording medium having the program or the digital signal recorded thereon or by transferring the program or the digital signal via the network or the like, the present disclosure may be implemented by a different independent computer system.

(10) The above exemplary embodiment and the above variation may be combined with each other.

INDUSTRIAL APPLICABILITY

The present disclosure relates to a battery data management method, a battery data management system, and a recording medium in which battery data can be safely managed using the blockchain technology.

The invention claimed is:

1. A battery data management method for use in a battery data management system including an electric vehicle and a plurality of authentication servers each including a distributed ledger, the battery data management method comprising:

obtaining, by the electric vehicle, first sensor information about a battery attached to the electric vehicle;

generating, by the electric vehicle, first transaction data including an ID of the battery and the first sensor information;

obtaining the first transaction data by one authentication server included in the plurality of authentication servers; and recording a block including the first transaction data into the distributed ledger by the one authentication server, the block including a chain consisting of a hash value of a previous block in the distributed ledger, and the distributed ledger being synchronized between the plurality of authentication servers.

2. The battery data management method according to claim 1, wherein in the obtaining of the first sensor information, the electric vehicle obtains travel data obtained during travel of the electric vehicle and the first sensor information obtained during the travel, and in the generating of the first transaction data, the electric vehicle generates the first transaction data that includes the ID of the battery, the travel data, and the first sensor information obtained during the travel.

3. The battery data management method according to claim 1, further comprising:

performing first mutual authentication between the electric vehicle and the battery before the obtaining of the first sensor information about the battery; and obtaining the first sensor information about the battery by the electric vehicle when the first mutual authentication is successful.

4. The battery data management method according to claim 1, wherein the first sensor information includes a voltage, an electric current, a temperature, and an impedance at the battery and acceleration information of the electric vehicle having the battery attached thereto.

5. The battery data management method according to claim 1, wherein the battery data management system further includes a charging station capable of charging the battery when the battery is connected to the charging station, and the battery data management method further comprises:

obtaining, by the charging station, second sensor information about the battery charged by connection to the charging station;

generating, by the charging station, second transaction data including the ID of the battery and the second sensor information;

obtaining the second transaction data by the one authentication server; and recording a block including the second transaction data into the distributed ledger by the one authentication server.

6. The battery data management method according to claim 5, further comprising:

performing, before the obtaining of the second sensor information about the battery, second mutual authentication between the charging station and the battery connected to the charging station for the purpose of charging; and obtaining the second sensor information by the charging station when the second mutual authentication is successful.

7. The battery data management method according to claim 5, wherein the second sensor information includes a voltage, an electric current, a temperature, and an impedance at the battery.

8. The battery data management method according to claim 1, wherein the battery data management system further includes a battery evaluation server, and the battery data management method further comprises:

obtaining transaction data about the battery by the battery evaluation server, the transaction data being recorded in the distributed ledger;

evaluating the battery by the battery evaluation server using the transaction data about the battery that has been obtained;

generating third transaction data including an evaluation result of the battery and the ID of the battery by the battery evaluation server;

obtaining the third transaction data by the one authentication server; and recording a block including the third transaction data into the distributed ledger by the one authentication server.

9. The battery data management method according to claim 8, wherein the evaluation result of the battery includes an evaluation result of a state of the battery, the state including a remaining value of the battery.

10. The battery data management method according to claim 8, wherein the evaluation result of the battery includes a battery ID of the battery and a determination on whether or not to recycle the battery, the determination being made based on a state of the battery.

11. A non-transitory computer-readable recording medium having recorded thereon a program causing a computer to execute a battery data management method for use in a battery data management system including an electric vehicle and a plurality of authentication servers each including a distributed ledger, the program causing the computer to execute:

obtaining, by the electric vehicle, first sensor information about a battery attached to the electric vehicle;

generating, by the electric vehicle, first transaction data including an ID of the battery and the first sensor information;

obtaining the first transaction data by one authentication server included in the plurality of authentication servers; and recording a block including the first transaction data into the distributed ledger by the one authentication server, the block including a chain consisting of a hash value of a previous block in the distributed ledger, and the distributed ledger being synchronized between the plurality of authentication servers.

12. A battery data management system comprising:

a plurality of authentication servers each including a distributed ledger; and an electric vehicle, wherein the electric vehicle includes:

a first communicator that obtains first sensor information about a battery attached to the electric vehicle; and a transaction data generator that generates first transaction data including an ID of the battery and the first sensor information, and one authentication server included in the plurality of authentication servers includes:

a second communicator that obtains the first transaction data; and a recorder that records a block including the first transaction data into the distributed ledger, the block including a chain consisting of a hash value of a previous block in the distributed ledger, and the distributed ledger being synchronized between the plurality of authentication servers.

13. The battery data management method according to claim 1, further comprising the following performed by the one authentication server:

verifying a signature assigned to the first transaction data;

executing a consensus related to the first transaction data between the plurality of authentication servers when the verifying is successful; and recording the block including the first transaction data into the distributed ledger when an agreement is made as a result of the executing of the consensus.

14. The non-transitory computer-readable recording medium according to claim 11, the program further causing the computer to execute the following performed by the one authentication server:

verifying a signature assigned to the first transaction data;

executing a consensus related to the first transaction data between the plurality of authentication servers when the verifying is successful; and recording the block including the first transaction data into the distributed ledger when an agreement is made as a result of the executing of the consensus.

15. The battery data management system according to claim 12, wherein the one authentication server:

verifies a signature assigned to the first transaction data;

executes a consensus related to the first transaction data between the plurality of authentication servers when verification of the signature is successful; and records the block including the first transaction data into the distributed ledger when an agreement is made as a result of execution of the consensus.

\* \* \* \* \*